United States Patent [19]

Rudd

[11] 4,197,441

[45] Apr. 8, 1980

[54] HIGH FREQUENCY INDUCTION WELDING WITH RETURN CURRENT PATHS ON SURFACES TO BE HEATED

[75] Inventor: Wallace C. Rudd, New Canaan, Conn.

[73] Assignee: Thermatool Corporation, Stamford, Conn.

[21] Appl. No.: 901,360

[22] Filed: May 1, 1978

[51] Int. Cl.² .................... H05B 5/00; B23K 11/08
[52] U.S. Cl. .................................. 219/9.5; 219/8.5; 219/10.43; 219/10.79; 219/106
[58] Field of Search .................. 219/9.5, 10.79, 8.5, 219/7.5, 6.5, 10.43, 67, 64, 102, 104, 106, 107, 108

[56] References Cited

U.S. PATENT DOCUMENTS

| | | | |
|---|---|---|---|
| 1,809,468 | 6/1931 | Bornand et al. | 219/9.5 X |
| 2,281,805 | 5/1942 | Schenk | 219/106 |
| 2,692,322 | 10/1954 | Bennett | 219/9.5 X |
| 3,230,337 | 1/1966 | Viart | 219/9.5 |
| 3,860,778 | 1/1975 | Rudd et al. | 219/9.5 X |
| 3,872,275 | 3/1975 | Rudd | 219/9.5 X |

FOREIGN PATENT DOCUMENTS 1380087  10/1964  France ........................... 219/9.5

*Primary Examiner*—Bruce A. Reynolds
*Assistant Examiner*—Philip H. Leung
*Attorney, Agent, or Firm*—Brooks, Haidt, Haffner & Delahunty

[57] ABSTRACT

Methods of heating and welding together portions of a metal part or parts in which the portions are positioned in facing, generally parallel and spaced apart relation and an induction coil overlies the part or parts and is positioned so as to induce oppositely flowing currents in the part or parts which flow in two closed paths, one each side of the portions to be heated. The portions may be stationary or be advanced during heating, and after the portions reach welding temperature, they are pressed together to form a weld therebetween. Sides of the coil are spaced from the portions by a distance at least ten times the reference depth of the currents in the metal to permit the currents to flow on the surfaces of the portions which are nearest each other, and the spacing between such surfaces, which is not greater than five times the thickness of one portion, and the current frequency, which is at least 3000 Hz, are selected so that a portion of each current path is on one such surface by reason of proximity effect. Spaced contacts in series with the coil and contacting one portion may be substituted for one side of the coil.

44 Claims, 55 Drawing Figures

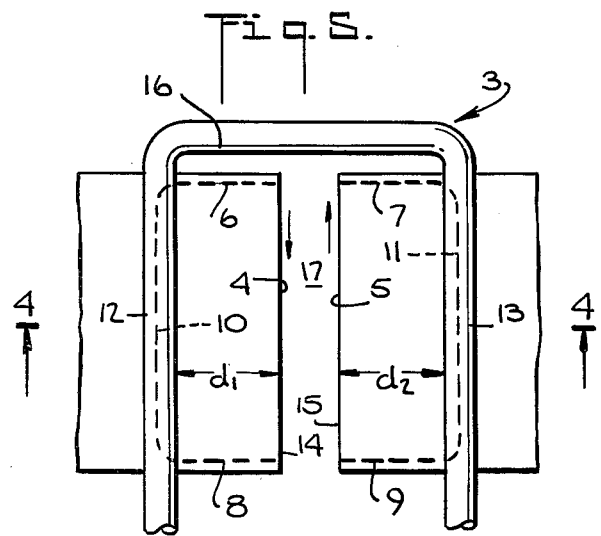
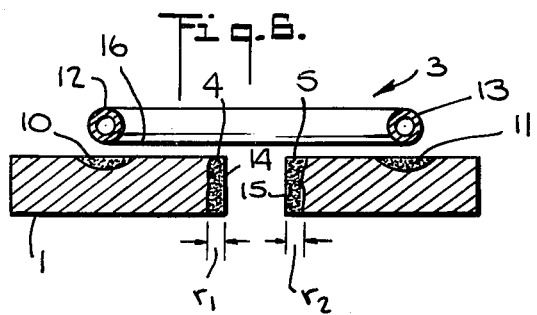
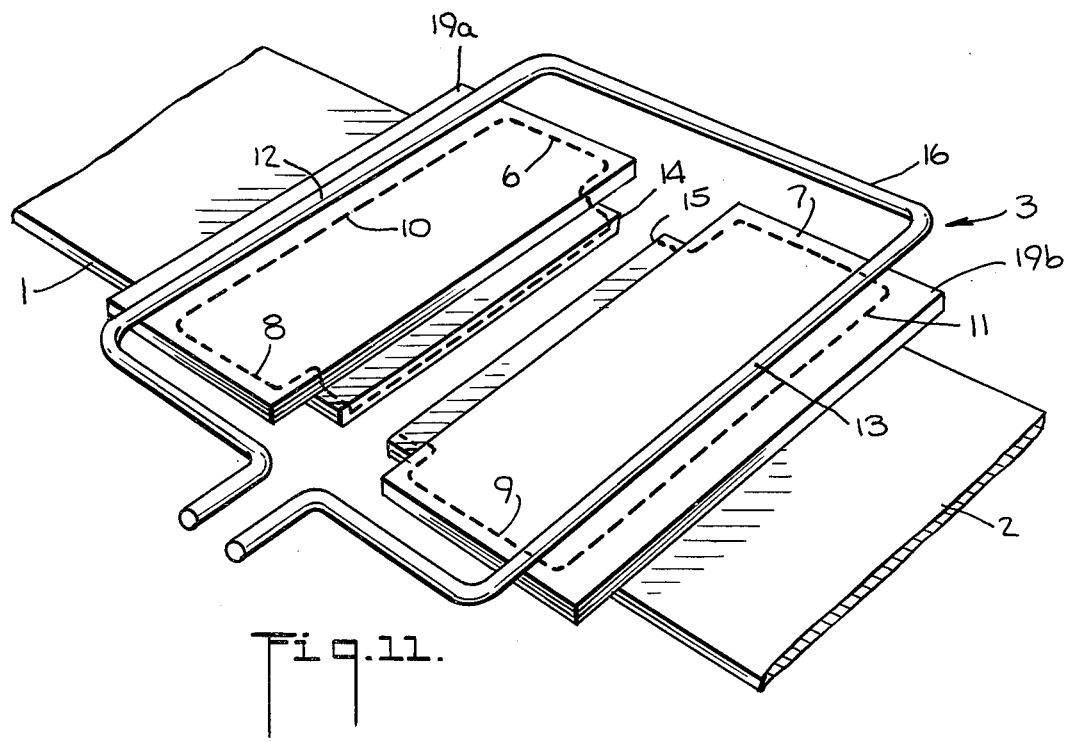

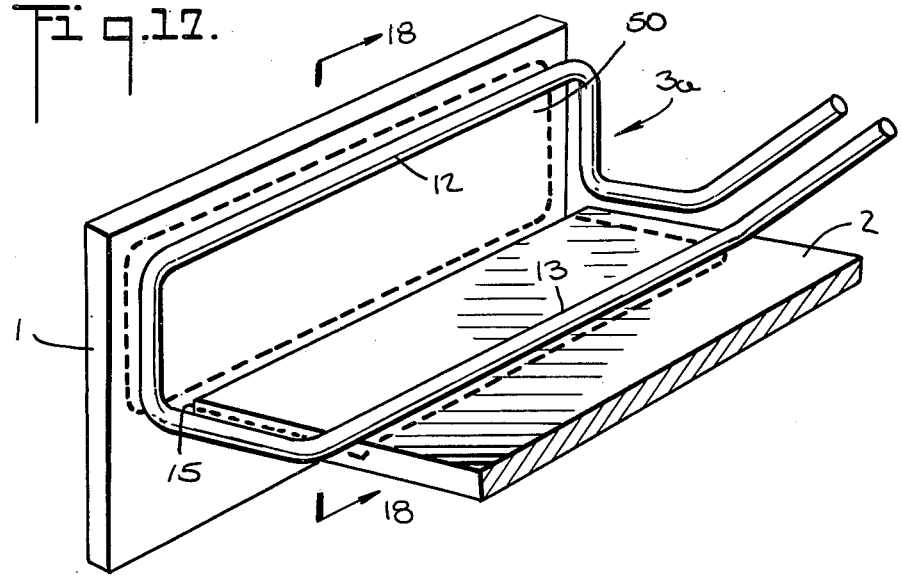
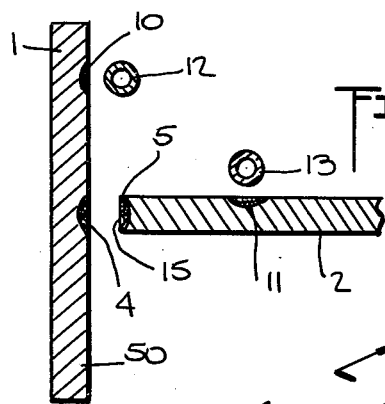
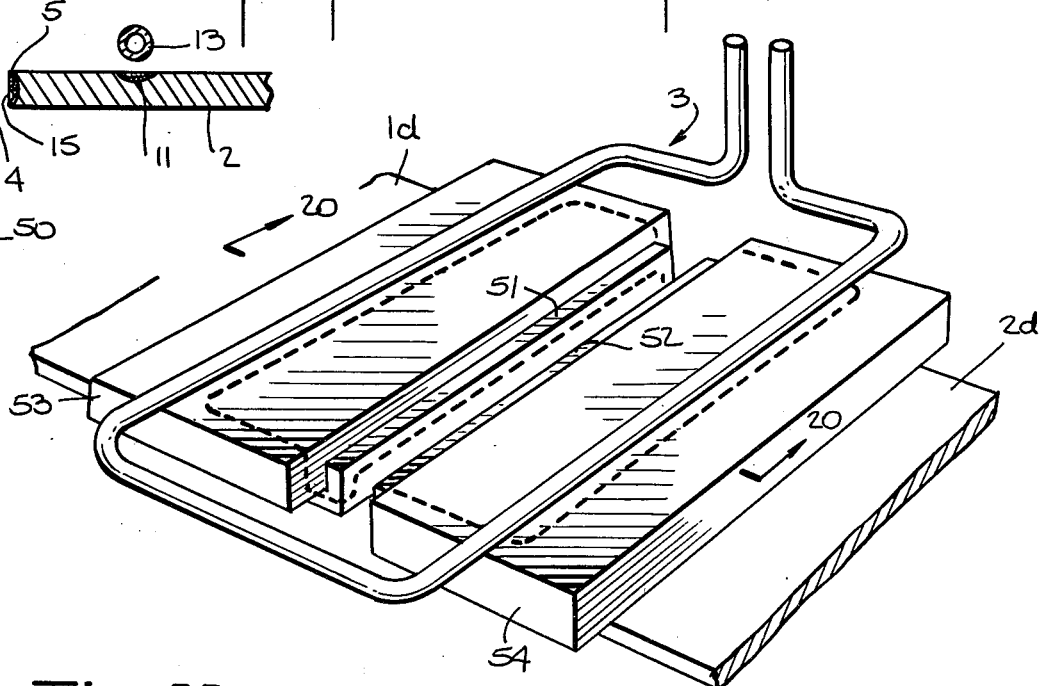
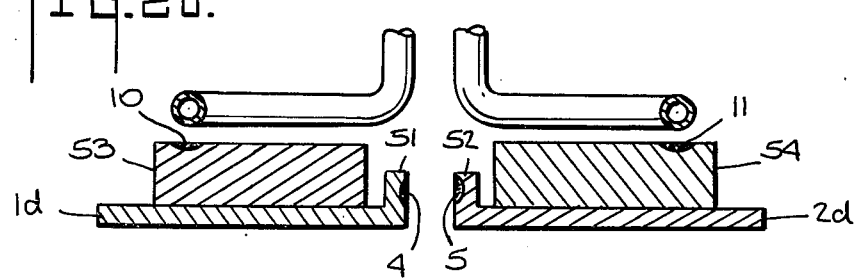

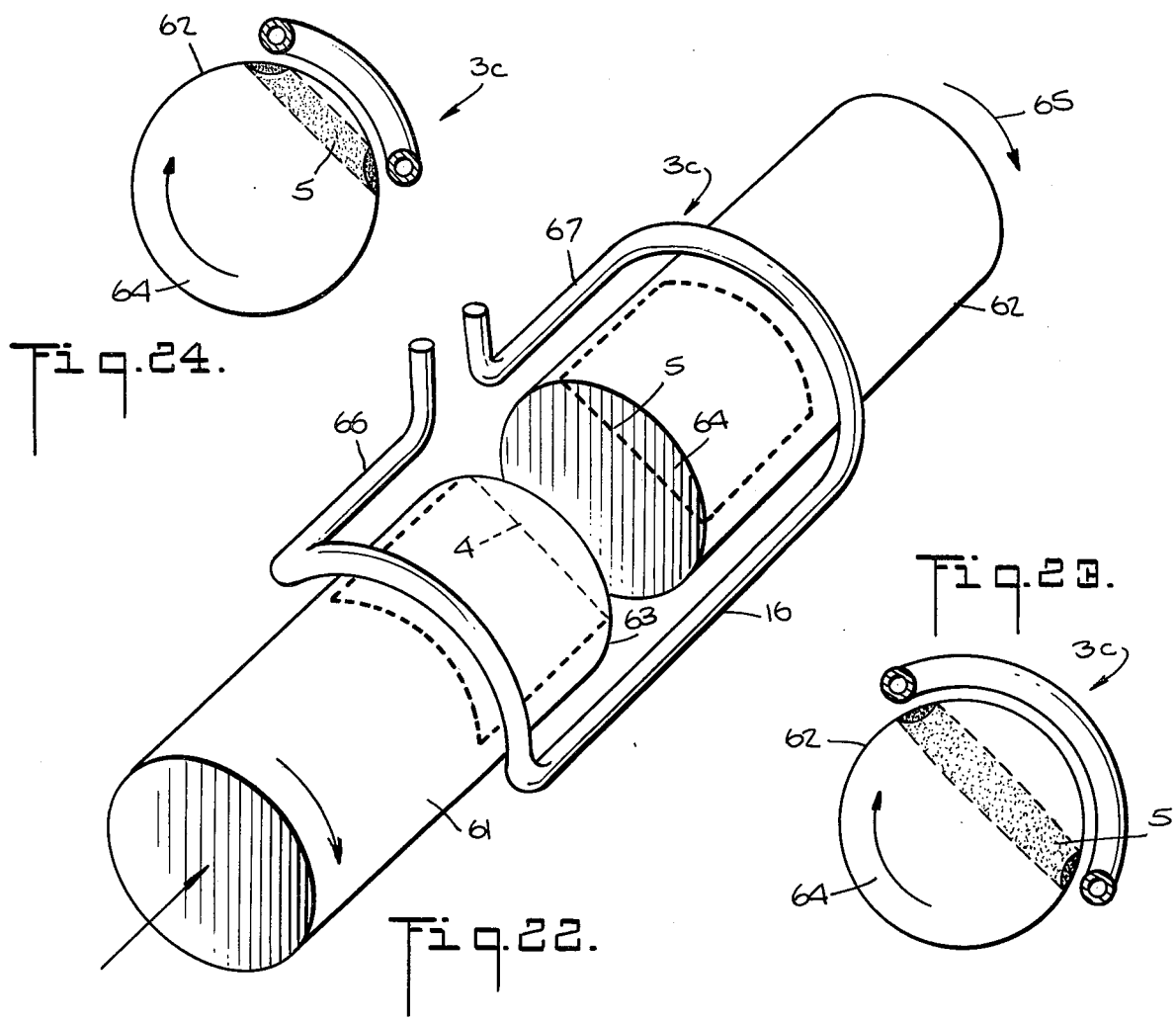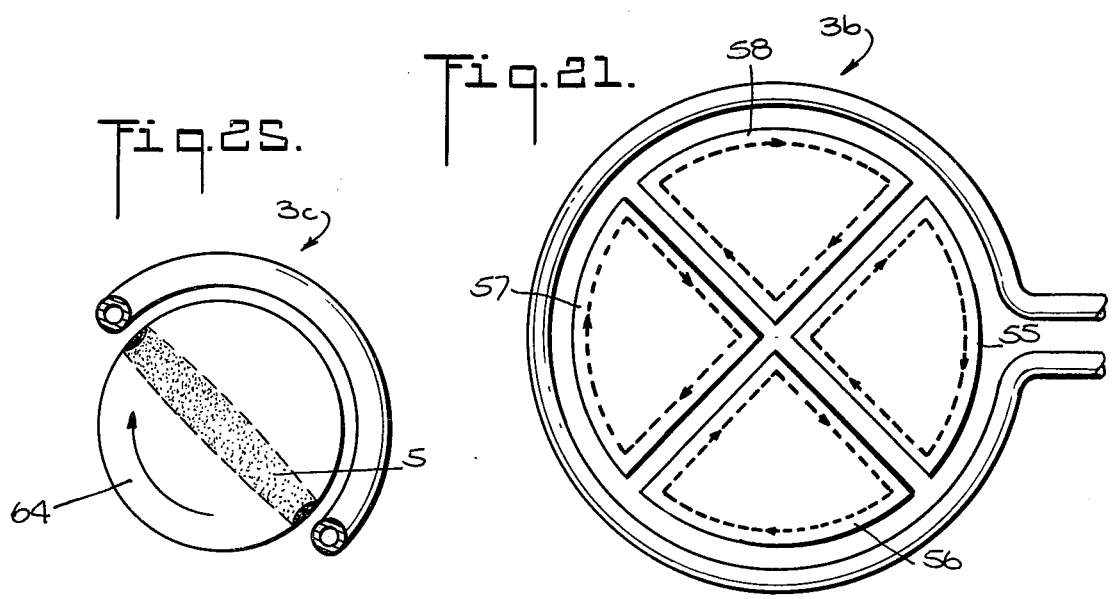

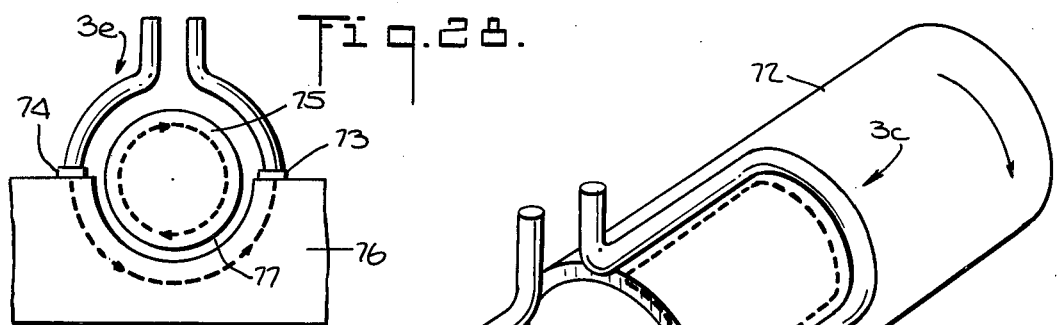
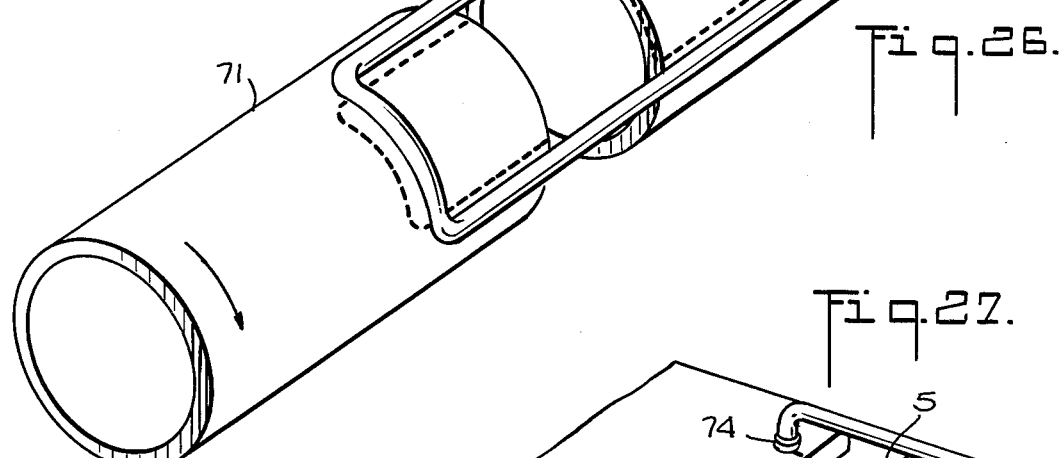
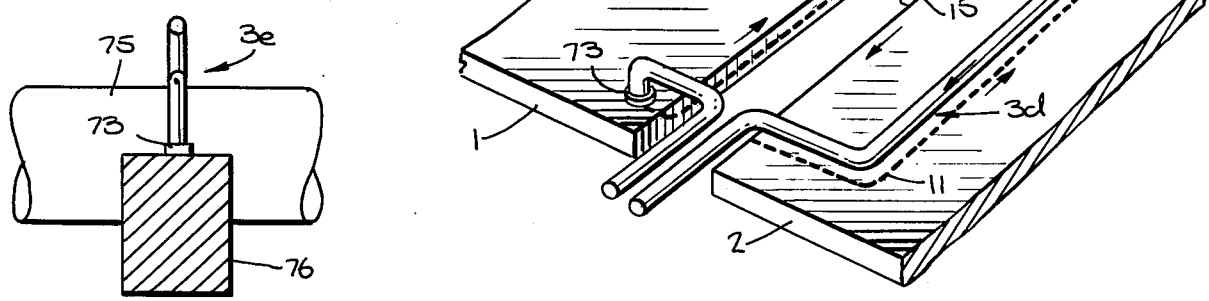
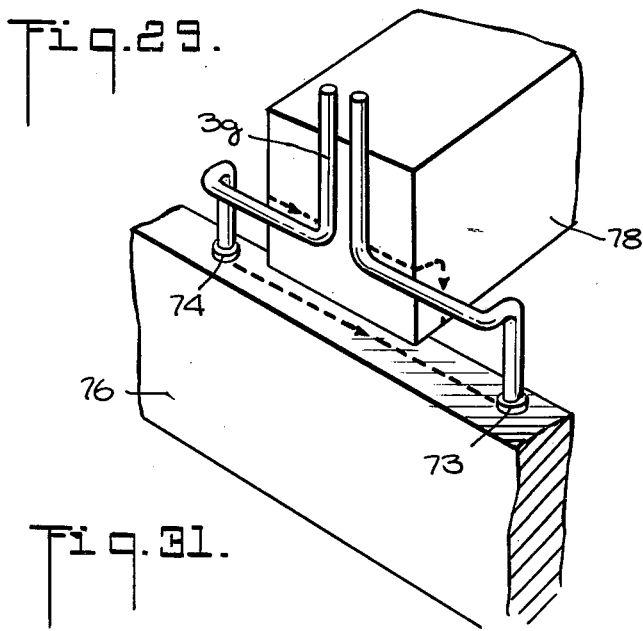
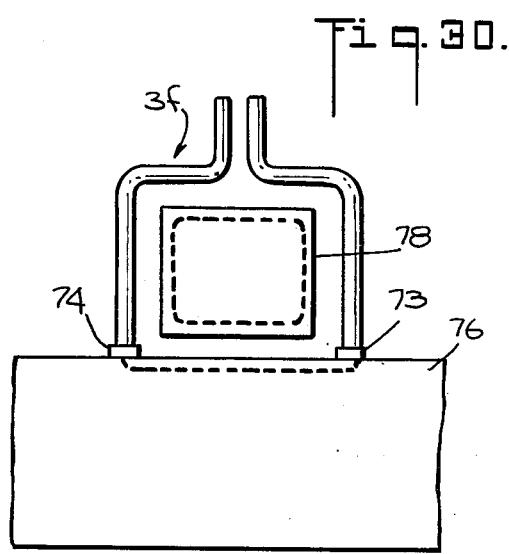

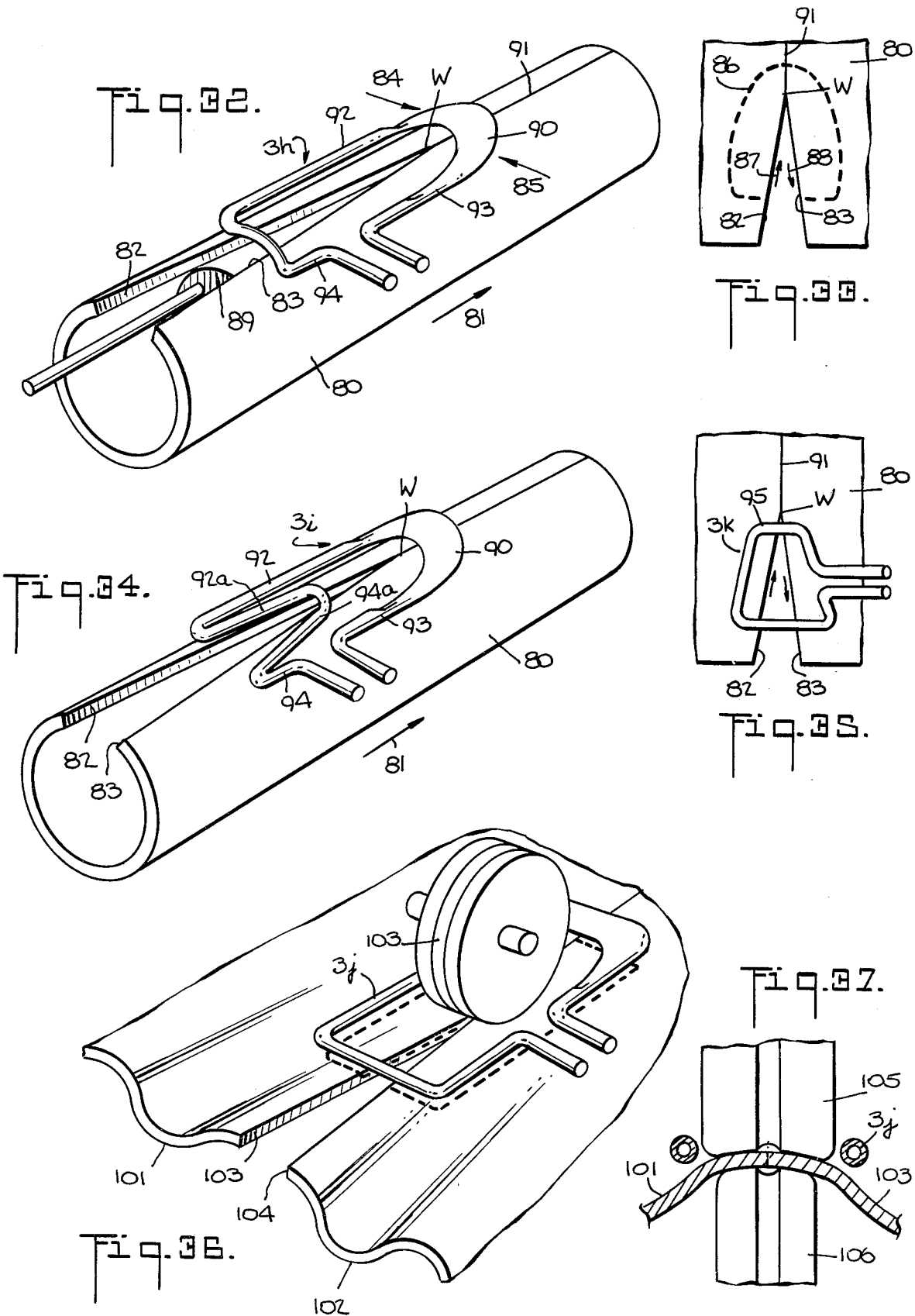

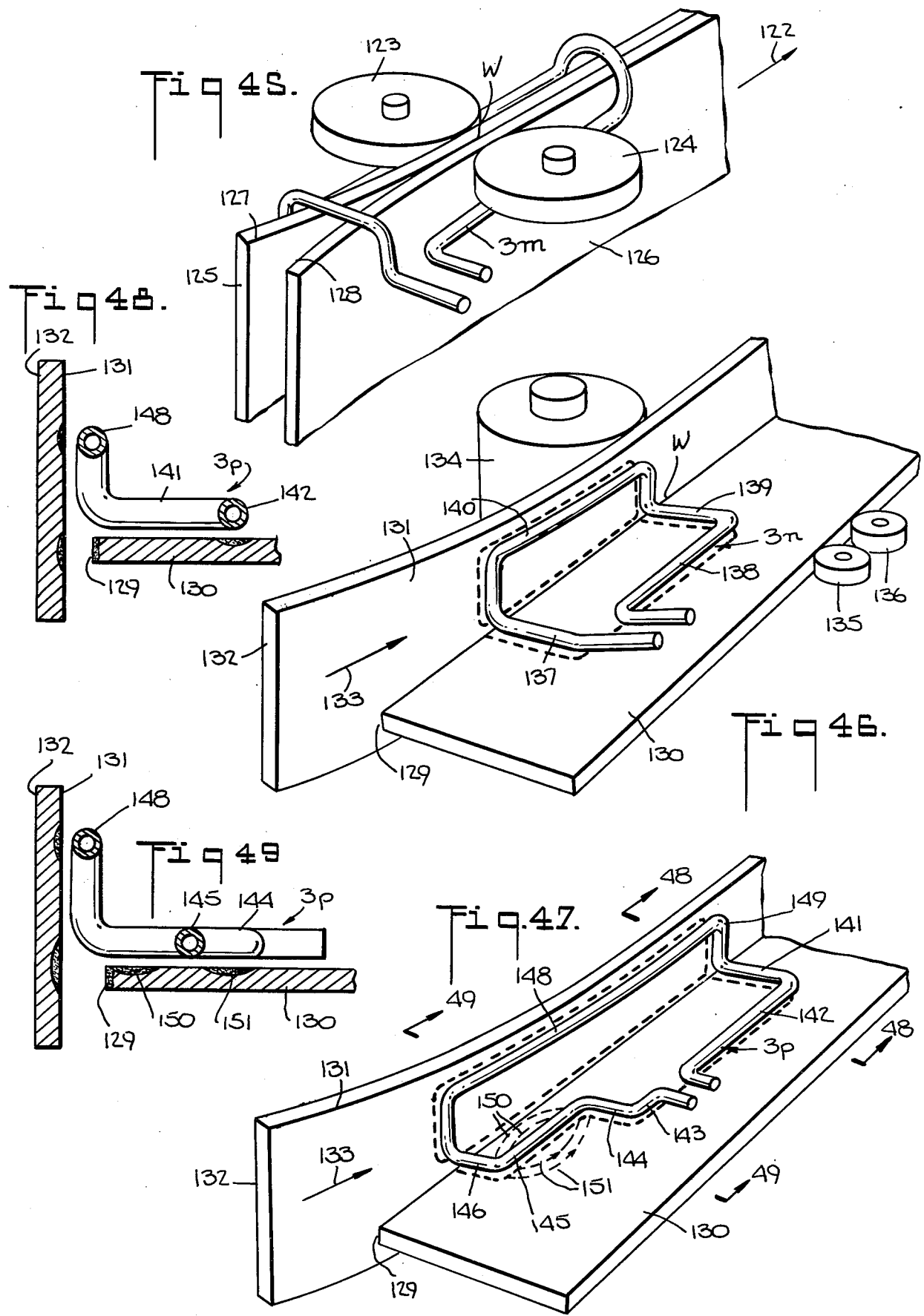

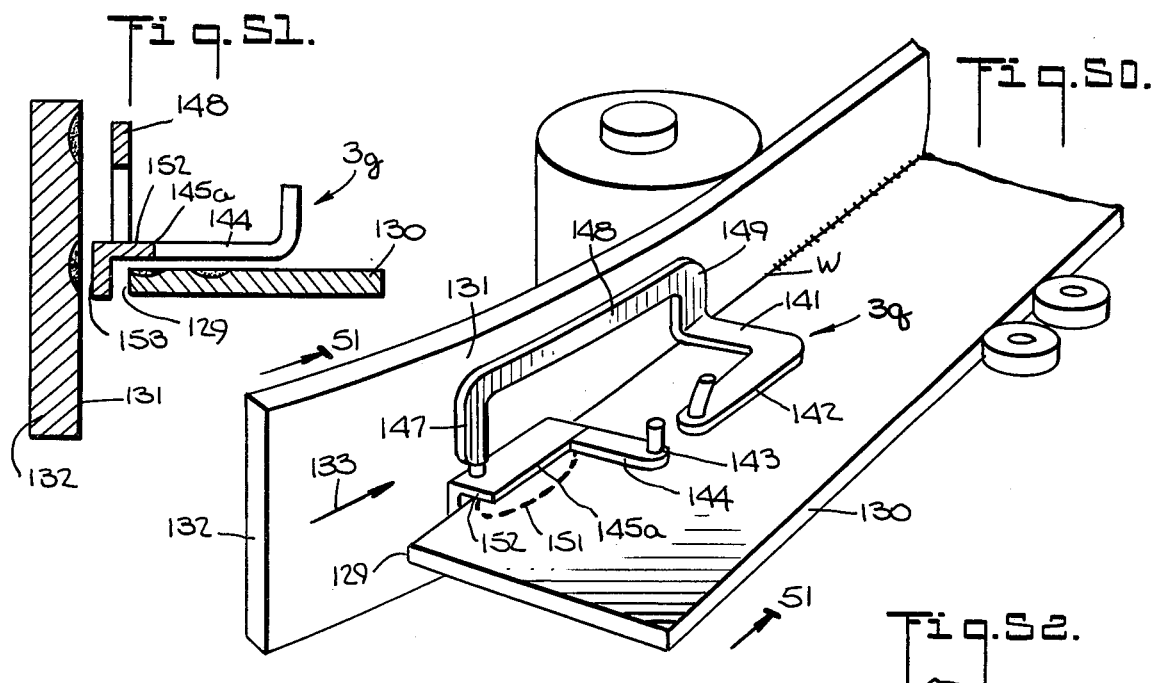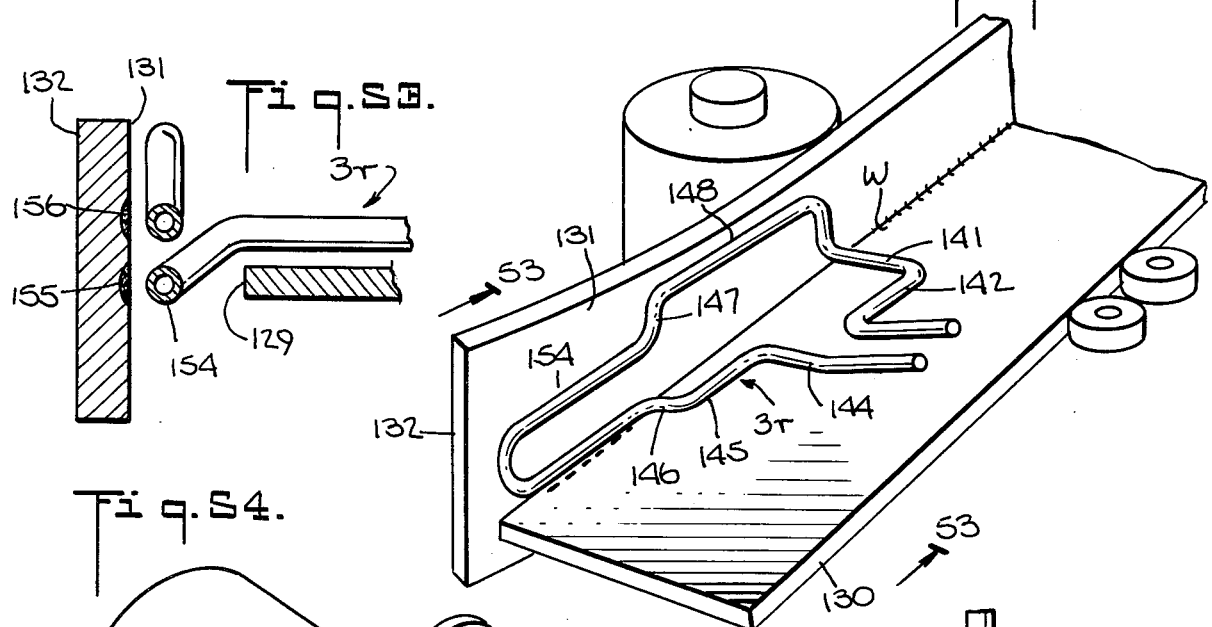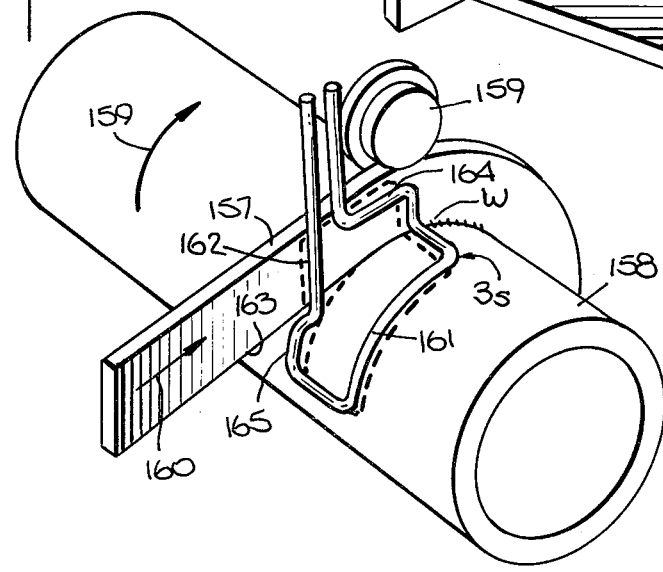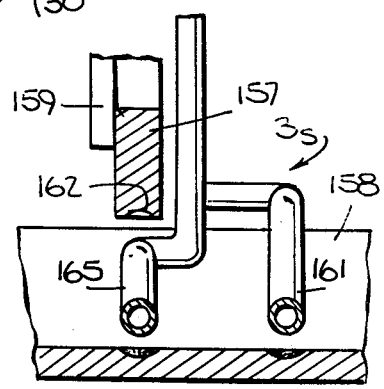

HIGH FREQUENCY INDUCTION WELDING WITH RETURN CURRENT PATHS ON SURFACES TO BE HEATED

The invention relates to the welding together of metal parts using induced electrical currents, such parts being adjacent to each other but spaced apart during the heating thereof by such currents and being forced together after heating to welding temperature.

The use of induced electric currents for the heating of the edge portions of metal parts, either two separate parts or two adjacent portions of the same part, for the purpose of welding them together, either by forge or melt welding, is well known in the art. In general, with induction heating, electric currents are induced in the parts by means of an electrically energized coil, of one or more turns, disposed adjacent to the surfaces to be heated to the welding temperature. Welding of this type is disclosed in U.S. Pat. Nos. 1,365,198; 1,915,082; 2,475,348; 2,632,079; 2,647,981; 2,846,554; 3,072,772, and others.

One of the problems encountered with such welding is that the induced currents must flow in closed paths which means that even if the currents flow along the portions to be heated to welding temperature, they must also flow elsewhere in the metal parts to complete the current path. Generally speaking, only the current flow in the portions to be welded together is useful whereas the heating elsewhere is wasted. Also, the current tends to flow in the metal parts along a path which follows the shape of the inducing coil as closely as possible.

I have discovered that by a special combination of conditions, that is, loop size, configuration and placement, heating current frequency, and part separation, high speed welding of metal parts using an induction coil for inducing the heating currents can be accomplished without certain of the disadvantages of the prior art.

One object of the invention is to provide apparatus for high speed induction welding of metal parts which concentrates the heating current at the edges to be welded together while reducing certain non-useful heating of the metal parts.

In accordance with the preferred embodiment of the invention, a loop or coil of high electrical conductivity metal, e.g., copper, which is water cooled, is disposed adjacent to, but spaced from, the faces of metal parts or a metal part to be heated, with portions of the loop extending substantially parallel to the faces. The spacing between said loop portions and said faces of the metal nearest thereto, in the direction parallel to the plane in which the loop portions lie, is at least ten times the reference depth of the current in such faces. The frequency of the heating current employed is selected so as to provide substantial proximity effect between the currents flowing at the faces and is at least 3000 hertz but preferably, is at least 10 kilohertz, frequencies of 400–500 kilohertz being commonly used. The spacing between the faces is also maintained less than five times the thickness dimension of the faces so that there is substantial proximity effect.

The objects and advantages of the invention will be apparent to those skilled in the art from the following description of the presently preferred embodiments thereof, which description should be considered in conjunction with the accompanying drawings, in which:

FIGS. 5 and 6 are, respectively, diagrammatic, plan and cross sectional, end elevation views corresponding respectively to FIGS. 1 and 2 and illustrate the principles of the invention;

FIG. 11 is a diagrammatic, perspective view illustrating the application of the principles of the invention to the welding together of a pair of metal parts with currents induced therein for heating purposes by an induction coil;

FIGS. 15 and 16 are, respectively, perspective and cross sectional, end elevation views illustrating the lap welding together of the opposite end portions of a metal sheet being formed into a tube;

FIGS. 17 and 18 are, respectively, perspective and cross sectional, end elevation views illustrating the welding together of the end of a metal part to the surface of another part to form a T weld;

FIGS. 19 and 20 are, respectively, diagrammatic perspective and cross sectional, end elevation views illustrating the welding together of the flanges or lips of a pair of metal parts;

FIG. 21 is a diagrammatic perspective view illustrating the welding together, at their edges, of a plurality of metal segments, the current being induced therein by a single induction coil;

FIG. 22 is a diagrammatic, perspective view illustrating the welding together of the ends of a pair of metal shafts;

FIGS. 23, 24 and 25 are end elevation views of one of the shafts shown in FIG. 22 and illustrates the effect of changing the width of the induction coil;

FIG. 26 is a diagrammatic, perspective view illustrating the welding together of the ends of a pair of metal tubes;

FIG. 27 is a diagrammatic, perspective view illustrating the welding together of the ends of a pair of metal parts using both an induction coil and contacts to cause the currents to flow in the metal parts;

FIGS. 28 and 29 are, respectively, diagrammatic end elevation and side elevation views illustrating the welding of a rod to a bar using both an induction coil and contacts to supply currents to the rod and bar;

FIG. 30 is an end elevation view similar to FIG. 28 and illustrates the welding of a rod of square cross section to a bar using both an induction coil and contacts to supply the current to the rod and the bar;

FIG. 31 is a diagrammatic, perspective view illustrating the welding of a rod of square or rectangular cross section to a bar with the coil shaped to provide the desired current distribution in the rod;

FIG. 32 is a diagrammatic, plan view illustrating continuous seam welding of a tube using the principles of the invention and an induction coil to produce the heating currents to the tube edges to be welded together;

FIG. 33 is a fragmentary, plan view similar to FIG. 32 with the induction coil removed and illustrates the current paths in the tube metal;

FIG. 34 is a diagrammatic, plan view similar to FIG. 32 and illustrates a specially shaped induction coil;

FIG. 35 is a diagrammatic, fragmentary, plan view illustrating the use of the induction coil in advance of the welding point;

FIGS. 36 and 37 are, respectively, diagrammatic, perspective and cross sectional, end elevation views illustrating the welding together of a pair of corrugated metal sheets or of the trailing and leading edges of a single corrugated metal sheet being spirally wound into a tube;

FIGS. 44 and 45 are diagrammatic, perspective views illustrating respectively the welding together of the lips of a pair of metal sheets, and the welding together of the edge portions of a pair of metal sheets;

FIG. 46 is a diagrammatic, perspective view illustrating the continuous welding of the edge of a metal plate to a surface of another metal plate using the principles of the invention;

FIG. 47 is a diagrammatic, perspective view similar to FIG. 46 but using a differently shaped induction coil;

FIGS. 48 and 49 are cross sectional views of the embodiment shown in FIG. 47;

FIG. 50 is a diagrammatic, perspective view similar to FIGS. 46 and 47 but illustrating a differently shaped induction coil;

FIG. 51 is a cross sectional view of the embodiment shown in FIG. 53;

FIG. 52 is a diagrammatic, perspective view similar to FIGS. 47 and 50 but illustrating the use of a differently shaped induction coil;

FIG. 53 is a cross sectional view of the embodiment illustrated in FIG. 52;

FIG. 54 is a diagrammatic, perspective view illustrating the welding of a metal fin to the peripheral surface of a metal tube; and FIG. 55 is a fragmentary, side view, partly in cross section, of the embodiment shown in FIG. 54.

Figure 1:
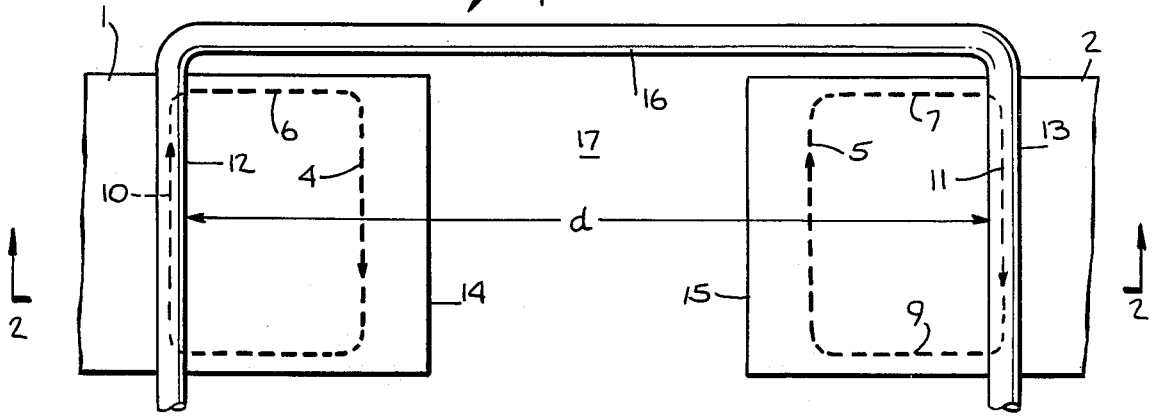
FIGS. 1 and 2 are fragmentary, diagrammatic views showing, respectively, in plan and cross sectional, and elevation, a pair of metal parts or opposite end portions of a single part associated with an induction coil, and are used for the purposes of illustrating the principles of the invention.

For a better understanding of the invention, it is desirable to call attention to certain phenomena associated with metal heating by electric currents. Thus, the heat developed is proportional to the square of the current times the effective resistance of the path through which the current flows. The effective resistance to the current depends upon the skin effect, i.e., the increased density at the surface of the part, the proximity effect, i.e., the tendency of the current in the part to flow as near as possible to the conductor of an induction coil or to a proximity conductor carrying oppositely flowing current, and the reference depth, i.e., the equivalent depth assuming (even though it is not the case) a uniform current distribution to such depth, which is defined by the formula:

$$d \text{ in inches} = 3160\sqrt{(p/uf)}$$

where p is the resistivity of the metal in ohm inches, u is the relative magnetic permeability and f is the frequency in cycles per second. It will be noted that reference depth decreases with increases in frequency, which, in turn, means that the effective resistance increases with frequency. Since reference depth is also dependent upon permeability, and since magnetic materials such as steel lose their magnetic properties above a certain temperature (Curie point), it will be apparent that the reference depth for such materials progressively increases as they are heated.

The reference depth of current in a metal is determined from the formula set forth hereinbefore, and it is sometimes referred to as the depth in which 86% of the heat is developed and within which about 86% of the current flows. Typical reference depths, in inches, in various metals at 70° F., are as follows:

| Material | Frequency - Kilohertz | | | | |
|---|---|---|---|---|---|
| | 0.06 | 3 | 10 | 100 | 400 |
| Steel* | 0.041 | 0.0066 | 0.002 | 0.00059 | 0.0003 |
| Aluminum | 0.430 | 0.110 | 0.033 | 0.010 | 0.005 |
| Brass | 0.640 | 0.150 | 0.050 | 0.016 | 0.008 |
| Copper | 0.336 | 0.085 | 0.026 | 0.008 | 0.005 |

*Below Curie Point; for non-magnetic steel or magnetic steel above Curie Point multiply by 100 for approximate value.

Proximity effect is also dependent both on current frequency and the spacing between the paths carrying oppositely flowing currents. At current frequencies below about 3000 hertz, proximity effect is relatively small, insofar as the welding of the invention is concerned, but proximity effect becomes significant at 3000 hertz or higher and becomes increasingly important at 50 kilohertz and higher. At spacings between the centers of round conductors of the order of five or more times the conductor diameters, the effect is relatively small, but with spacings less than twice the diameters, the effect is significant. Similar effects are present with conductors of other shapes. Thus, in order to be effective for the purposes of the invention, the heating current frequency must be at at least 3000 hertz and the spacing between the faces of the metal portions to be heated to welding temperature must be less than five times the width of the narrower face being heated.

The width of current path in the part is also influenced by the use of magnetic pieces at the sides of the current path and by the shape and spacing of the conductor of an induction coil and of the conductor carrying oppositely flowing current. At high frequencies the path of the major portion of the current is determined mainly by the reactance of the path rather than by the resistance thereof, and therefore, the major portion of the current may not follow the physically shortest path between two points of different potential.

Of course, heat is transferred to the portions of the part outside the path of current by conduction flow at a rate dependent upon the thermal conductivity of the metal, but, by rapidly heating the metal in the major current path to a high temperature and then discontinuing the current flow, the temperature of such portions may be kept low as compared to that of the current carrying metal.

For all these reasons, the path of current flow and its effective dimensions, the heating and temperature obtained and the localization of the heating are dependent upon many factors including the presence or absence of a proximity conductor, the location of the induction coil, with respect to the part to be heated, the time duration of current flow, the electrical and thermal characteristics of the metal, the configuration of the part being heated, the presence or absence of magnetic material adjacent the current path, etc. In accordance with the invention, use is made of such phenomena to localize and control the heating at the parts to be welded together and to heat portions of such parts to welding temperature without raising the temperature of the metal spaced a short distance from such portions to such temperature.

Figure 2:
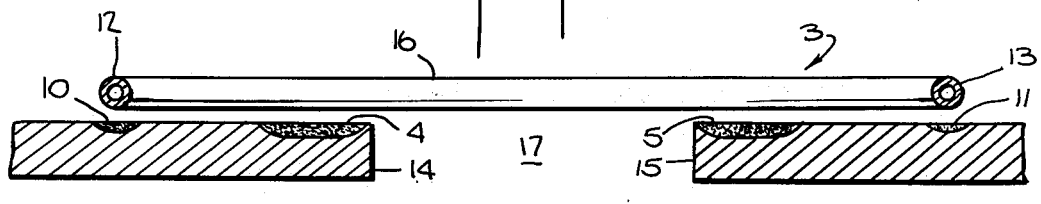

FIGS. 1 and 2 illustrate the flows of induced currents in a pair of metal parts 1 and 2 when such currents are induced by an induction coil or loop 3 and there is insignificant proximity effect between oppositely flowing, return current path portions 4 and 5. Similar current flows are produced when parts 1 and 2 are the edge portion of a single metal sheet being formed into a tube, as described in said U.S. Pat. No. 3,072,772, and the loop 3 does not extend to the weld point. Thus, each closed current path includes return current path portions 4 and 5, end portions 6-9 and portions 10 and 11 which underlie the portions side 12 and 13 of the loop 3, the portions 12 and 13 extending substantially parallel to the end faces 14 and 15 of the parts 1 and 2. The dimension of the faces 14 and 15 parallel to the plane of the drawing in FIG. 2 will be referred to as the thickness dimension of the faces, and the dimension of the faces perpendicular to such plane in FIG. 2 will be referred to as the width dimension of the faces. It will be observed that the width and thickness dimensions of the face 14 are parallel to the corresponding dimensions of the face 15 and that the portions 12 and 13 lie in a plane which is parallel to the width dimension of the faces 14 and 15.

The shaded portions 4,5, 10 and 11 in FIG. 2. indicate the relative distribution of the induced currents but indicate only the major currents, there being other current flows of relatively smaller magnitude. Thus, beneath the loop portions 12 and 13, the currents are relatively concentrated, but elsewhere, and particularly in the return path portions 4 and 5, the currents are relatively widely distributed although they will be relatively more concentrated in the path portions 6 and 7 than in the portions 4 and 5 because of the proximity of the interconnecting portion 16 of the loop 3. However, because the return currents, that is, the currents in paths which do not underlie the loop 3, try to follow paths having the lowest impedance, they will be distributed over a relatively wide area but as close as possible to the loop 3 if the return paths are all of the same impedance, and the currents will even flow in metal outside the space between the loop portions 12 and 13. FIG. 1 and 2 also illustrate the major current flows of FIG. 2 of said U.S. Pat. No. 3,072,772.

It will be observed that such currents do not follow the end faces 14 and 15, where maximum heating is desired, and therefore, the end faces 14 and 15 are heated to welding temperature mainly by conduction of heat through the metal. This, of course, is undesirable not only because of the heat wasted in the heating to welding temperature of more metal than is necessary but also because, with large currents, metal in the paths of maximum current may overheat or melt before the end faces 14 and 15 reach welding temperature.

FIGS. 1 and 2 also illustrate what happens when the principles of the invention are not employed, that is, the conditions are such that the end faces 14 and 15 are not part of the paths of the principal currents. In other words, the current frequency and/or the spacing of the end faces 14 and 15 are such that the proximity effect is insufficient to cause the currents to flow on the end faces 14 and 15.

Figure 3:
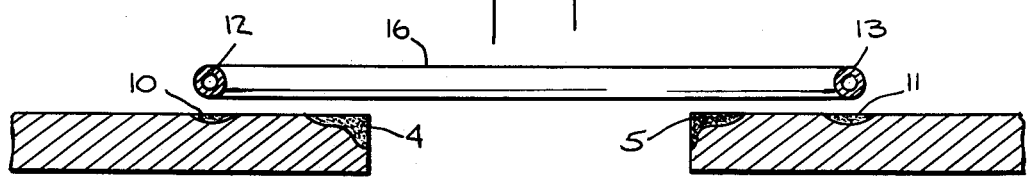
FIGS. 3 and 4 are cross sectional end elevation views similar to FIG. 2.
Figure 4:
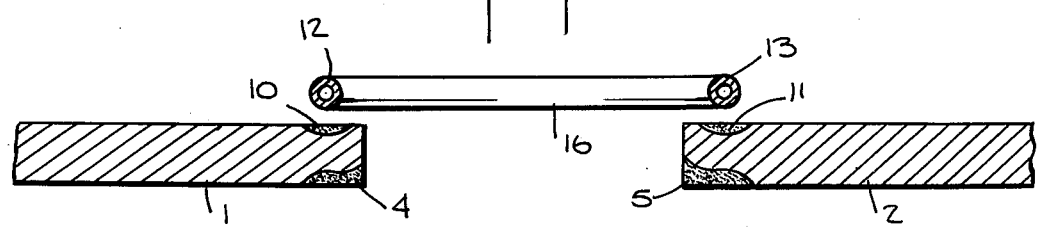

It is to be noted that merely decreasing the spacing (FIG. 1) between the portions 12 and 13 of the loop 3 will not cause the current paths 4 and 5 to be concentrated on the edge faces 14 and 15. Instead, because the current tries to follow the shortest path, in the absence of a significant proximity effect, between the ends of the portions 10 and 11 of the path which underlie the loop 3, consistent with the requirement that there be separate paths for oppositely flowing currents, the current concentration will change and the return currents will flow elsewhere. Thus, as shown in FIG. 3, when the spacing of the portions 12 and 13 is decreased from the spacing assumed in the showing of FIG. 2, the current paths 4 and 5 are centered substantially at the upper corners of the parts 1 and 2 with some current on the upper surface and the end faces thereof. With a further decrease in such spacing, i.e. with the loop portions 12 and 13 substantially above the end faces as shown in FIG. 4, the current paths 4 and 5 are at the lower corners and surfaces of the parts 12 and 2. At in-between spacings, the current of the paths 4 and 5 have intermediate positions, but are not concentrated on the edge faces. The prior art has failed to appreciate these effects, and those skilled in the art have assumed that, as the spacing decreases, the major return currents are on the upper surfaces of the parts and outside the loop. See for example, U.S. Pat. No. 3,072,772, which proposes to solve the problem with the use of a contact bridge.

It should also be noted that the shaded areas representing the current paths 4 and 5 are representative of only the principal return current paths and do not represent all the return current paths, some return current flowing elsewhere in the metal parts 1 and 2 and being wasted. Since the heating of the end faces, where heating is desired, increases with the square of the current thereat, even a relatively small increase in the current flowing at the end faces provides a substantial improvement in heating efficiency. In accordance with the invention, the heating efficiency is improved substantially by increasing the amount of the return currents at the end faces.

FIGS. 5 and 6 illustrate the current flows when the principles of the invention are employed, namely, the use of heating currents having a frequency of at least 3000 hertz, a spacing between the end faces 14 and 15 adjacent to the loop portions 12 and 13 of less than five times, and preferably, less than three times, the thickness dimension of the end faces 14 and 15 and spacings of $d_1$ and $d_2$ between the loop portions 12 and 13 and the end faces 14 and 15 of between ten and 100 times, respectively, the reference depths $r_1$ and $r_2$ of the current in the end faces 14 and 15. For best results, the spacing between the faces 14 and 15 should be equal to or less than the thickness dimension of the faces 14 and 15 and the frequency of the currents should be at least 50 KHz. If metal parts 1 and 2 are made of the same metal $r_1 = r_2$, and if they are made of magnetic steel, $r_1$ and $r_2$ refer to reference depths above the Curie point temperature since the end faces 14 and 15 will reach a temperature above the Curie point temperature for welding purposes.

It will be observed that the portions 12 and 13 of the coil 3 extend substantially parallel to the end faces 14 and 15 and lie in a plane which is perpendicular to the median plane of the end faces 14 and 15 and which is parallel to the width dimensions of the faces 14 and 15. Generally speaking, the portions 12 and 13 will be as close as possible to the upper surfaces of the parts 1 and 2, consistent with mechanical and voltage limitations, to provide maximum coupling between the coil 3 and the parts 1 and 2.

An advantage of the invention which may not be immediately obvious is that in addition to causing the currents to flow at the end faces 14 and 15, the proximity effect also reduces the magnitude of the currents which flow outside the space between the loop portions 12 and 13 and which flow other than at the end faces 14 and 15.

In addition, with currents of relatively high frequency, e.g., about 100 kilohertz, increases of the spacings $d_1$ and $d_2$, within reasonable limits, say up to 300 times the reference depth, will not significantly change the distribution of the current flow at the end faces 14 and 15. However, it has been found that if the spacings $d_1$ and $d_2$ are unequal the end face 14 or 15 having the greater spacing with respect to the corresponding loop portion, respectively 12 and 13 will heat more in a given period of time. In other words, there is unequal heating of the end faces 14 and 15 which may be advantageously employed if it is desired to heat one end face more than the other, for example, if the parts 1 and 2 are made of different metals which should be heated to different temperatures for welding purposes, or if the parts 1 and 2 are made of the same metal but have different thicknesses and require different heating.

Tests employing the principles of the invention have been conducted using the arrangements in FIGS. 5 and 6. The dimensions and as follows:

| Parts 1 and 2 | Carbon steel plates 1¼ in. wide, 12 in. long and 0.125 in. thick |
|---|---|
| Coil 3 | ¼ in. copper tubing |
| Coil 3 spacing from parts | ⅛ in. |
| Spacing of end faces 14 and 15 | ⅛ in. |
| $d_1$ and $d_2$ | approximately 1 in. |
| Current source | 160 kilowatts at 400 Khz |
| $r_1$ and $r_2$ | 0.03 inches (above Curie point) |

The end faces 14 and 15 heated to white heat, and hence, to welding temperature, almost immediately and in under one second. There was much less heating under the coil portions 12 and 13, and the adjacent corners of the parts 1 and 2 appeared to heat to the temperature of the end faces which indicates the proximity effect of the coil portion 16. It will be noted that $d_1$ and $d_2$ were about thirty-three times the reference depth.

While it may be true that the invention has not eliminated the current path portions 6–11, which may be considered as producing wasted heat, nevertheless, the return current path portions 4 and 5 are located where desired, which avoids the need for heating metal inwardly of the faces 14 and 15 by a substantial distance, and for the reasons set forth hereinbefore, more of the currents flow on the path portions 4 and 5 than in the arrangement illustrated in FIGS. 1 and 2. In addition, by keeping the spacing between the portions 12 and 13 as close as possible to twenty times the reference depth, the current path portions 6–9 are kept short. Although the parts 1 and 2 may be separate parts, they may be opposite end portions of the same work piece, for example, the opposite end portions of a strip or sheet which is bent so as to form an almost complete cylinder.

It will be observed that the currents are relatively concentrated in the path portions 10 and 11 underlying the loop portions 12 and 13, but the metal in such paths 10 and 11, being between cool metal portions, will heat up less rapidly than the metal at the faces 14 and 15. Accordingly, the current concentration in the path portions 10 and 11 may be tolerable. However, if this is not the case, the currents in the portions 10 and 11 may be made less concentrated, with lower effective resistance and slower heating, by suitably shaping the portions 12 and 13.

Figure 7:
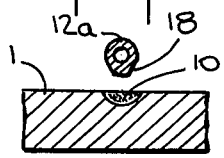
FIGS. 7–10 are fragmentary, cross sectional, end elevation views illustrating the effect of the induction coil conductor size, shaping and spacing on the current induced in a metal part.
Figure 8:
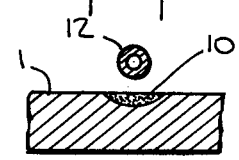

FIGS. 7–11 illustrate approximately the effect of the shape of the conductor of a loop 3 on the current concentration or distribution. FIG. 7 illustrates a loop portion 12a which corresponds to the portion 12 and 13 and which is tapered in cross section so that the lower part 18 thereof, nearer the part 1, is narrower than the upper part thereof. FIG. 8 illustrates the loop portion 12 of hollow cylindrical cross-section and by comparing FIGS. 7 and 8, it will be seen that the current is less concentrated, or more widely distributed, with a loop portion 12 cylindrical cross-section.

Figure 9:
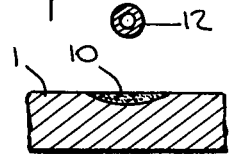

The current concentration can be made less by increasing the spacing between the portion 12 (or 13) and the part 1 (or 2), as shown in FIG. 9, but such increase in spacing decreases the coupling between the loop 3 and the parts 1 and 2 which makes it more difficult to induce currents of the desired magnitude in the parts 1 and 2. However, such decrease in coupling can be at least partially offset by the use of magnetic materials, in a conventional manner, disposed around the three sides of each portion of the loop 3. On the other hand, reduced coupling by means of spacing may be advantageous if unequal heating of the faces 14 and 15 is desired. For example, if the portion 12 is farther from the part 1 than the portion 13 is from the part 2, more current will flow in the end face 15 than in the end face 14, thereby causing faster heating of the end face 15.

Figure 10:
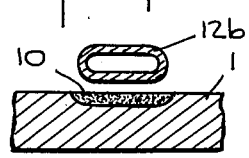

As will be apparent from FIG. 10, another, and preferable, way to reduce the current concentration in the path portion 10 but without reduced coupling is to widen the loop portion over the path portion 10. Thus, as shown in FIG. 10, a conductor 12b of elliptical cross-section is disposed over the plate 1 to produce a relatively wide path portion 10. Loop portion 13 may have a similar cross-section. Such reduction of the concentration not only spreads the heating over a wider area but also reduces the effective resistance of the path and thereby reduces $I^2R$ losses and hence, the heating in the path.

A further way in which the heating of the metal parts 1 and 2 by the currents, e.g. in the path portions 10 and/or 11, may be reduced is to insert plates of copper, or other high electrical conductivity metal, between the coil portions 12 and/or 13 and the metal parts 1 and 2 as illustrated in FIG. 11. As shown in FIG. 11, a pair of copper plates 19a and 19b are placed on the top surfaces of the parts 1 and 2, in conductive contact therewith and are not only between the coil portions 12 and 13 and the parts 1 and 2 but also extend toward the faces 14 and 15 so that at least part of the return current paths 6–9 are in the plates 19a and 19b. In this way, the current flow in the parts 1 and 2 is restricted substantially to the end faces 14 and 15. However, if it is desired to substantially eliminate current flow in the parts 1 and 2 only under the coil portions 12 and 13, the width of the plates 19a and 19b, that is, in the direction perpendicular to the portions 12 and 13, may be reduced so that the plates 19a and 19b underlie substantially only the portions 12 and 13. The plates 19a and 19b may have slots cut therein at their sides nearer the faces 14 and 15 in the manner and for the reasons described in U.S. Pat. No. 2,919,342.

Figure 12:
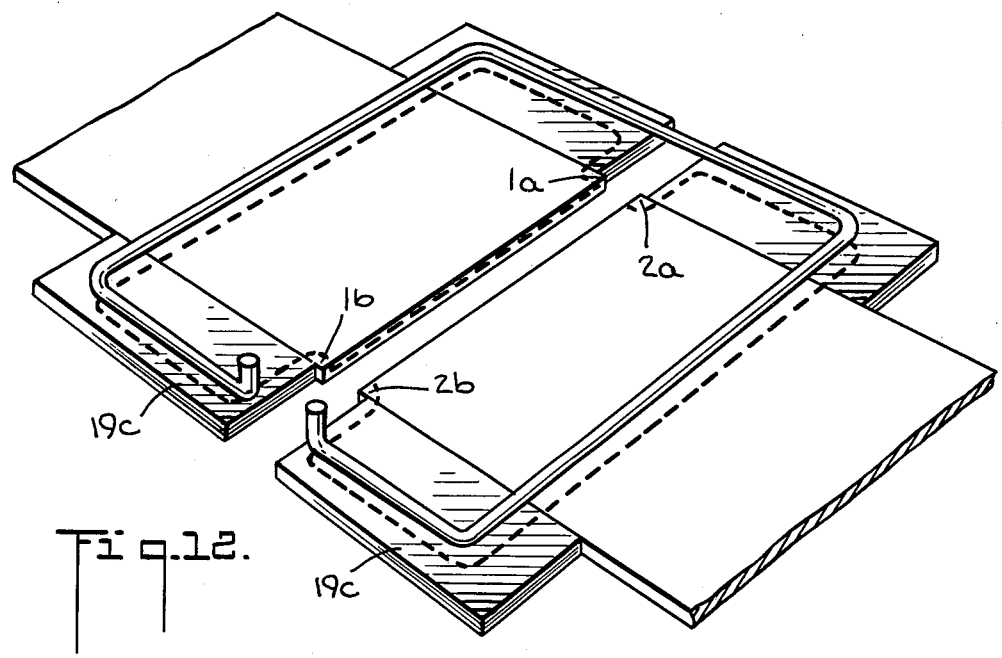
FIG. 12 is a diagrammatic perspective view similar to FIG. 11 and illustrating the use of end tabs for improving the heating of the metal parts to their ends.

With reference to FIG. 12, it may be that under some operating conditions, because of their location with respect to the remaining metal, the corners 1a, 1b 2a and 2b will overheat before the end faces 14 and 15 reach welding temperature along their length. In such cases, copper end tabs or blocks 19c may be located as shown in FIG. 12, the tabs 19c being in conductive contact with the parts 1 and 2, so that the currents flow in such tabs 19c rather than in path portions 6–9 in the parts. Such tabs 19c not only reduce heating of the metal adjacent to the corners 1a, 1b, 2a and 2c because the currents do not flow therein but also act as heat sumps thereby retarding heating at the corners 1a, 1b, 2a and 2b.

In the embodiments previously described, the metal parts 1 and 2 are not in contact at, or adjacent, their end faces 14 and 15. The induction coil is energized for the period of time necessary to cause the surfaces to be joined to reach welding temperature, either a forge welding temperature or a higher temperature at which the surfaces are molten, and the parts 1 and 2 are pressed together at the faces 14 and 15 by well-known means, a weld between the parts 1 and 2 formed of metal of the parts being produced as the metal cools.

If the metal parts 1 and 2 are accessible at the sides thereof opposite from the coil or coils shown in the previously described embodiments, a second coil or coils may be used at such opposite sides to induce additional currents in the part 1 and 2. In such case, the second coil or coils would be connected to the high frequency source so that the currents induced thereby have, at any instant, the same directions as the currents produced by the other coil or coils.

The use of the principles of the invention is not limited to the welding of the end faces of a pair of metal parts which is known as "butt" welding, tube welding, etc.

Figure 14:
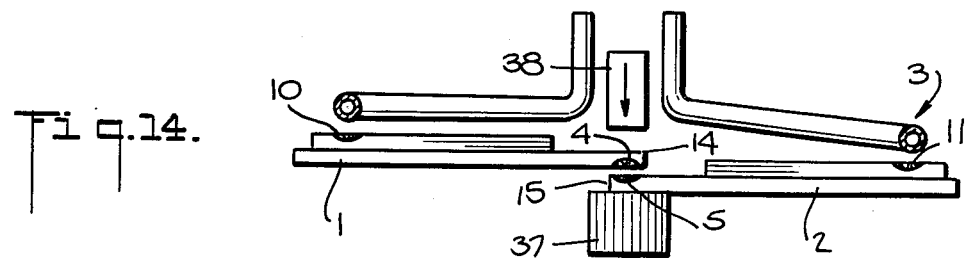
FIGS. 13 and 14 are, respectively, diagrammatic, perspective and cross sectional, end elevation views illustrating the welding together of a pair of metal parts using an induction coil, the metal parts being lap welded together.
Figure 13:
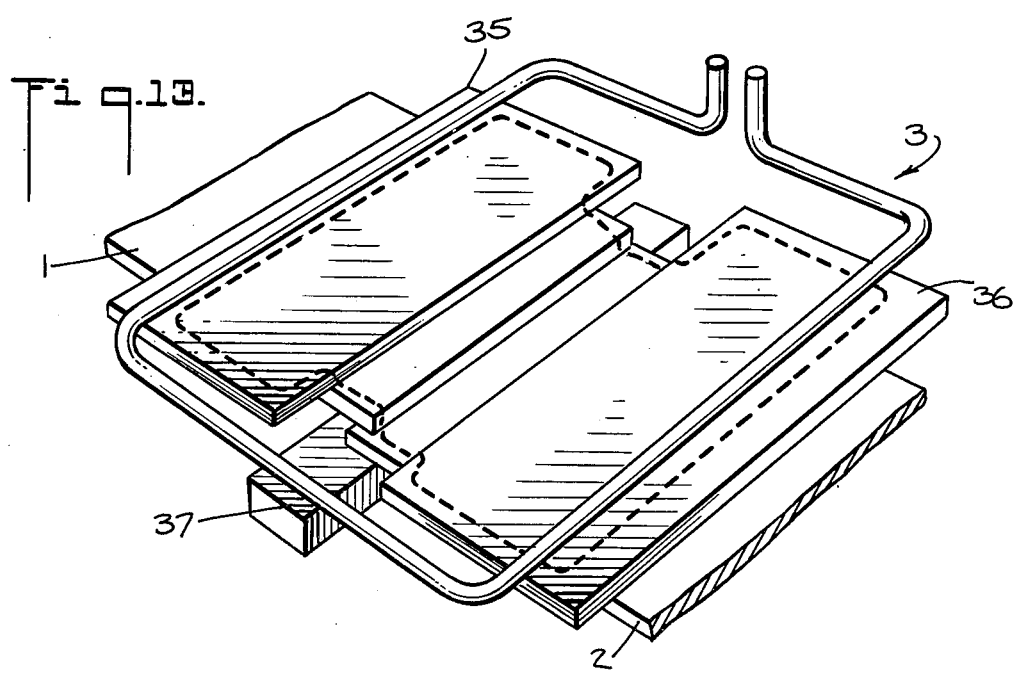
Figure 1S:
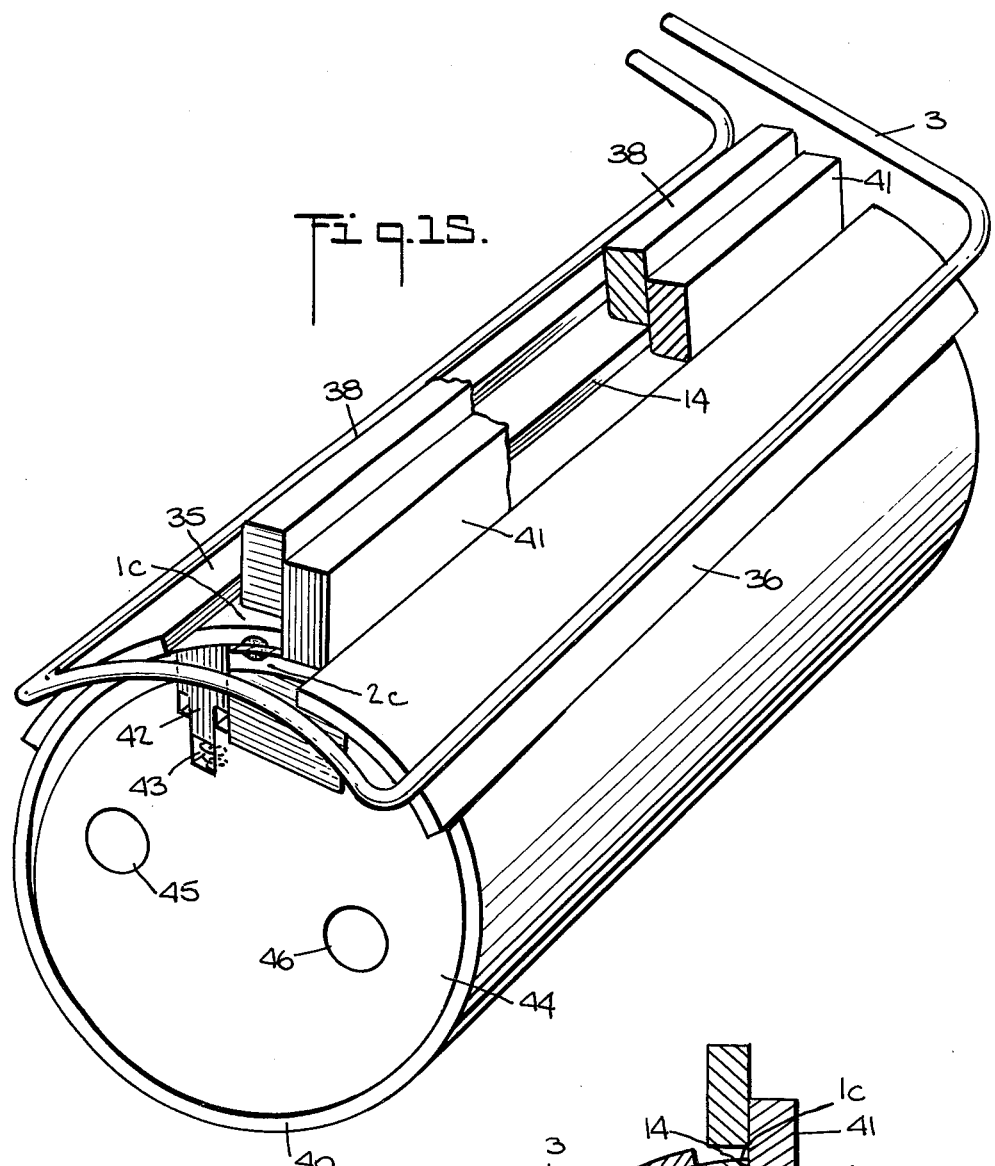
Figure 1B:
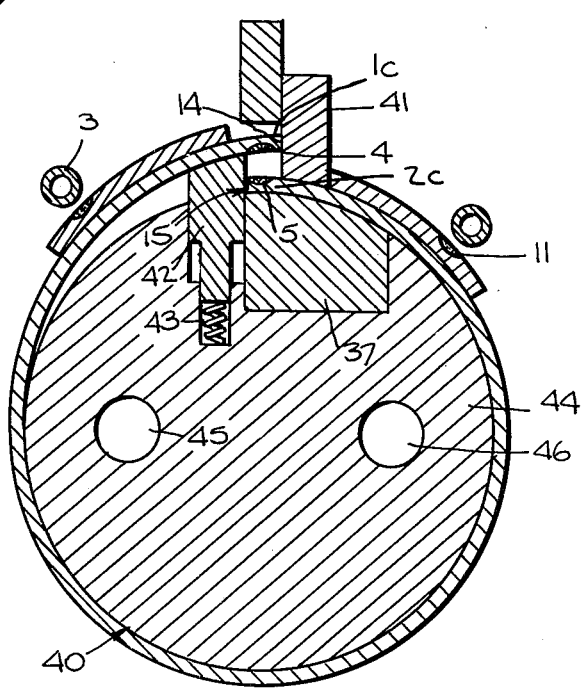

FIGS. 13 and 14 illustrate the application of the principles of the invention to the lap welding of a pair of metal parts 1 and 2. Preferably, a pair of copper plates 35 and 36 are placed between the coil 3 and the parts 1 and 2 and in conductive contact with the latter for the purposes described in connection with FIG. 11, but if desired and if the heating in the parts 1 and 2 away from the surfaces where welding is to be performed is tolerable, the plates 35 and 36 may be omitted. The plates 35 and 36 may be used to position the parts 1 and 2 in addition to forming part of the current paths.

In FIGS. 13 and 14, the metal parts 1 and 2 overlap at their ends, and in this case, because of the proximity effect, the paths 4 and 5 will be on the facing surfaces of the parts 1 and 2, at the overlapping portions thereof, rather than on the end faces 14 and 15. Thus, since the overlapping portions of the plates 1 and 2 are to be welded together, the currents are concentrated where desired, namely, at the facing surfaces of such portions. It will be observed, however, that the plane in which the portions 12 and 13 of the coil 3 lie is substantially parallel, or parallel, to the width dimensions of the portions of the parts 1 and 2 to be welded together and that the width and thickness dimensions of such portions are parallel, or substantially parallel. Also, the portions 12 and 13 are on opposite sides of the portions of the part 1 and 2 to be welded and are spaced from the latter by at least ten times the reference depth, and the spacing between the portions to be welded together is less than five times the dimension of the overlapping areas in the direction parallel to the plane of the coil portions 12 and 13, the latter dimension corresponding to the thickness dimension of the portions to be welded together. Of course, such latter dimension should be relatively small if a high concentration of currents in the paths 4 and 5 is to be obtained.

The lower surface of the part 2 either rests on, or is close to, the upper surface of an anvil 37, which may be made of a strong, hard metal, such as iron or steel, and after the facing surfaces of the overlapping portions are heated to the desired welding temperature, the overlapping portions may be pressed together by a hammer 38 made of a suitable material, e.g. iron or steel. If the part 2 rests against the anvil 37 and it is desired to reduce heat removal from the part 2, the anvil 37 may be made of a low heat conductivity material, such as silicon nitride.

The embodiment of the invention illustrated in FIGS. 13 and 14 is particularly suitable for the seam welding of cans as illustrated in FIGS. 15 and 16 which show an almost completed can body 40 formed of a metal sheet bent substantially into a cylinder. The opposite end portions 1c and 2c correspond to the parts 1 and 2, and the diameter of the body 40 and the current frequency are related, in a manner known to those skilled in the art, so that the impedance around the back of the body, that is, from the sides of the coil 3 in the direction away from the overlapping portions 1c and 2c to be joined by welding, is relatively high.

The end face 14 abuts a locator bar 41 made of a low electrical and thermal conductivity material, such as a ceramic or silicon nitride, and the end face 15 abuts a similar locator bar 42, the latter bar 42 being movable up and down and being urged upwardly by springs 43. The body 40, the anvil 37 and the bar 42 are carried and supported by a mandrel 44 which may be water cooled by way of the passageways 45 and 46.

After the facing surfaces of the overlapping portions 1c and 2c have reached the desired welding temperature, the heating current flowing along the paths 4 and 5 thereat, they are pressed together by the hammer 38 and the anvil 37. After the weld is formed the hammer 38 is raised, permitting removal of the welded can body 40.

The application of the principles of the invention to the welding of an end face 15 of a metal part 2 to a side face 50 of a metal part, is illustrated in FIGS. 17 and 18. Heating current, which flows along the paths 4 and 5 because of the proximity effect, is induced in the parts 1 and 2 by a coil 3a and heats the end face 15 and the adjacent portion of the side face 50 to welding temperature. Because of the location of the path 4, which is intermediate cooler areas, greater heating along the path 4 than along the end face 15 usually is required to bring the side face 50 up to the desired welding temperature. Such differential heating may be accomplished as described hereinabove, e.g. by positioning the portion 12 of the coil 3a with respect to the surface 50 so that its spacing with respect to the surface 50 is less than the spacing between the portion 13 and the part 2 or by making the spacing between the path 4 and the portion 12 greater than the spacing between the portion 13 and the end face 15.

In tests of the embodiment illustrated in FIGS. 17 and 18, it was found that when the portions 12 and 13 were equally spaced from the parts 1 and 2, respectively, the end face 15 melted with only slight heating along the path 4. However, when the spacing of the portion 13 from the surface of the part 2 was about ⅜ to ½ inch, sufficient heat was produced in the part 1 to provide a satisfactory weld. The parts 1 and 2 were made of steel and had faces six inches wide and ⅛ inches thick and a length of three inches. The coil 3a was made of 3/16-inch copper tubing and was connected to 160 kilowatt, 400 kilohertz source, and welding temperature at the face 50 and the end face 15 was produced in about one second.

To decrease the heating of the portions of the parts 1 and 2 which underlie the coil 3a, copper plates may be inserted between the coil 3a and the parts 1 and 2 as described in connection with FIG. 11.

FIGS. 19 and 20 illustrate the application of the principles of the invention to the welding together of flanges 51 and 52 on a pair of metal parts 1d and 2d. As shown in FIGS. 19 and 20, the paths 4 and 5 are at the facing surfaces of the flanges 51 and 52, and the paths 10 and 11, underlying the sides of the coil 3, are in copper blocks 53 and 54 which, after the facing surfaces of the flanges 51 and 52 reach welding temperature, may be used to press the flanges 51 and 52 together and to form a weld therebetween.

If it is desired to heat a plurality of parts simultaneously so that they will simultaneously reach welding temperature at their facing surfaces, the arrangement shown in FIG. 21 may be used. As shown in FIG. 21, a plurality of metal segments 55–58 are disposed in spaced relation with their rectilinear side faces adjacent to each other but in close relation so as to provide substantial proximity effect. Current is induced in the segments 55–58 by a coil 3b connected to a high frequency source, the coil 3b either being closely adjacent the peripheral, remaining faces of the segments 55–58 as shown in FIG. 21 or being immediately above such faces. The relative directions of the induced currents at one part of a current cycle are indicated by the dotted lines with arrows on the segments 55–58, and it will be observed that the currents at the adjacent rectilinear faces flow in opposite directions. The heating of the outer faces relative to the heating of the rectilinear faces may be controlled by suitably shaping the coil 3b as described hereinbefore in connection with FIG. 10. Of course, the segments and the coil 36 may have other shapes.

The invention is also applicable to the heating of the ends of metal shafts or metal tubes or pipes which are to be welded together at their ends. FIG. 22 illustrates a pair of metal shafts 61 and 62 disposed with their end faces 63 and 64 disposed closely adjacent so that there is substantial proximity effect. A coil 3c connected to a high frequency source is disposed closely adjacent to the peripheral surfaces of the shafts 61 and 62 for inducing currents in the shafts 61 and 62 which will flow mainly in the paths indicated by the dotted lines. It will be observed that, as far as possible, the paths underlie the coil 3c, but then, due to the proximity effect follow the shortest paths 4 and 5 across the end faces 63 and 64 of the shafts 61 and 62. As the shafts 61 and 62 are heated by the induced currents, they are rotated by any suitable means in the direction of the arrows 65 at a rate which will cause the entire surfaces of the end faces 63 and 64 to be heated to welding temperature, the central portion of the faces 63 and 64 being heated mainly by conduction with the coil 3c shown in FIG. 22.

The location of the paths 4 and 5 on the end faces 63 and 64 depends on the amount of the periphery of the shafts 61 and 62 which is between the end portion 16 and the portions 66 and 67 of the coil 3c. In FIG. 22, there is about 100° of arc between the axially extending portion 16 and the axially extending portions 66 and 67, and the path 5, and hence, the path 4, subtends about 100° of arc as shown in FIG. 23.

If the spacing between the portion 16 and the portions 66 and 67 is less than 100° of arc, then the path 5 traverses less of the end face 64 as illustrated in FIG. 24. If the spacing is too small, say about 60°, the outer portion of the face 64 may reach too high a temperature before the central portion reaches the desired welding temperature.

If the spacing between the portion 16 and the portions 66 and 67 are increased to about 180° of arc, as shown in FIG. 25, the path 5 will traverse the central portion of the face 64 which will tend to overheat the central portion. No advantage is obtained by increasing the spacing to more than 180°, and in fact, if the spacing is increased to the point where the impedance across the face 64 approaches the impedance of the surface of the shaft 60 outside of the space between the portion 16 and the portions 66 and 67, the end face current will be reduced thereby wasting heating current and reducing the rate of heating. For these reasons, the spacing between the portion 16 and the portions 66 and 67, at least where they overlie the peripheral edges of the faces 63 and 64, preferably is in the range from 80° to 150° when a weld between the entire end faces 63 and 64 is desired.

A pair of metal tubes or pipes 71 and 72, instead of a pair of shafts, may be welded together at their ends as illustrated in FIG. 26, the principles being the same as described for the shafts 61 and 62 except that the currents on the end faces of the tubes will, of course, be restricted to the metal of the end faces. However, it will be noted that the current flow at the end faces is in opposite directions, thereby taking advantage of the proximity effect, whereas if the coil encircled the end faces, the current flows at the end faces would be in the same direction and proximity effect would not be present. In fact, only the outer periphery of the tubes would be heated. In the embodiments illustrated in FIGS. 22–26, the axially opposite end portions of the coil 3c correspond to the portions 12 and 13 shown in FIGS. 1-6 and are each spaced from the ends of the shaft or tube ends carrying the return currents by a distance at least equal to ten times the reference depth in the metal of the shafts or tubes. Although such axially opposite end portions of the coil 3c lie in curved planes and the paths 4 and 5 of the return currents on the ends of the shafts 62 and 63 lie in rectilinear planes so that the portions being heated at any given instant lie in rectilinear planes, it is considered that, for the purposes of describing the invention, and due to the rotation of the shafts, the plane of the axially opposite end portions of the coil 3c may be considered as generally parallel to the width dimension of the portions heated by the currents.

With the shafts 62 and 63, the radial dimension or thickness of the paths 4 and 5 will be substantially equal to the circumferential dimension or thickness of the paths of the currents underlying the axially extending portions of the coil 3c. Therefore, at any given instant in the rotation of the shafts the thickness of the portions being heated is the thickness of said paths 4 and 5 so that the spacing between the shafts 62 and 63 should be less than five times said last-mentioned thickness. Similarly, in FIG. 26, the spacing between the tubes 71 and 72 should be less than five times the radial thickness of the tubes 71 and 72.

In all the embodiments previously described, the coil is uninterrupted and the heating currents are induced in both parts to be welded together.

It is known in the art that the resistance between a pair of contacting surfaces decreases with increases in frequency and that relatively small contacts and contact pressure can be used with high frequency currents. Also, it is not necessary, at high frequencies, that the contacting surfaces be as clean as when low frequency currents are involved. Accordingly, in some cases, it is possible to use one of the metal parts to be heated as an extension of the current inducing coil, the heating currents being conductively supplied to one of the metal parts by contacts electrically in series with the coil and the heating currents being induced in the other metal part to be heated.

As illustrated in FIG. 27, the coil 3d extends over the metal part 2 and induces current therein which is indicated by the dotted lines, but one end of the coil 3d is connected to a contact 73 which conductively engages the metal part 1, the current flowing in the part 1 from the contact 73 to the contact 74, and vice versa, along the path 4 on the end face 14 because of the proximity of the oppositely flowing current along the path 5 on the end face 15. Thus, in the preceding embodiments, the portions of the induction coil are coupled to both parts by the magnetic fields whereas in the embodiment shown in FIG. 27 the coil 3d has one portion which is inductively coupled to the part 2 and another portion which is conductively coupled to the part 1. However, in all cases, oppositely flowing currents are produced on the portions of the metal parts to be heated, and there is significant proximity effect between the currents because of the spacing of the portions and the frequency of the currents.

Because of coupling losses, the currents induced in the part 2 will be of a smaller magnitude than the current in the coil 3d whereas the current in the end face 14 will be of substantially the same magnitude as the current in the coil 3d. Accordingly, the heating current at the face 14 will be larger than the current at the end face 15 which means that the end face 15 will not reach the same temperature as the face 14 in a given amount of time if the parts 1 and 2 are made of the same metal and have the same dimensions. Although this may be tolerable in some cases because it is not always necessary that the faces 14 and 15 be at the same temperature to provide the desired weld, the embodiment in FIG. 27 will, in general, be used when the dimensions or metals are such that the metal of the face 14 is slower heating than the metal of the face 15. For example, if the metal of the part 1 is different from the metal of the part 2 and has a lower electrical resistance than the metal of the part 2 or if the part 1 is thicker and more massive than the part 2, a lower magnitude current at the face 15 may be desirable.

FIGS. 28 and 29 illustrate the use of the combination of a coil 3e and contacts 73 and 74 in the welding of the side face of a metal rod 75 of relatively small cross-sectional dimension such as may be the case when a grating is being manufactured. The bar has a cut-out nearly conforming to the shape of the rod 75 which may have a cross-sectional shape other than circular, e.g. square, triangular, etc. The coil 3e, when connected to a high frequency source, induces currents in the periphery of the rod 75, and the current of the coil 3e flows by way of the contacts 73 and 74 and the surface defining the cut-out 77 proximate to the rod 75. When welding temperature is reached, the rod 75 is pressed against the bar 76 to provide a weld therebetween. Although the rod 75 is shown spaced from the surface defining the cut-out 77, point contact therebetween during the heating will not significantly affect the current distribution or the heating.

FIG. 30 illustrates the welding of the side face of a rod 78 of square cross-section to an end face or the upper surface of the bar 76, no cut-out being used. The coil 3f induces currents in the rod 78 and current flows oppositely in the proximate surface of the bar 76 by way of the contacts 73 and 74.

If the rod 78 has a relatively large vertical dimension, the coil 3g shown in FIG. 31 may be used to keep the current path short and to keep the return current of the current loop near the lower surface (but spaced therefrom at least ten times the reference depth of the current in the metal of the rod 78), both effects aiding in increasing the rate of heating of the lower surface of the rod 78.

In the embodiments of the invention described hereinbefore, the metal parts to be welded together are held stationary during the heating thereof although they may be gradually moved toward each other during the heating so that they contact as welding temperature is reached. However, in each embodiment, the surfaces to be joined are of finite length, and welding is discontinuous. The principles of the invention may be applied to the welding of parts as they are moved in a direction parallel to the median plane of the surfaces to be welded together, the surfaces meeting at a weld point in the downstream direction where they are pressed together to form a weld. Such welding is known as continuous welding because the parts are being continuously pressed together at the weld point as surfaces of the parts are being heated in advance of the weld point, and welded structures of relatively long length can be produced without interrupting the welding. Such welding has been used for manufacturing tubing or pipe with a longitudinal welded seam, corrugated pipe with a spiral seam, finned tubing or pipe, structural elements, etc.

FIG. 32 illustrates schematically the use of the principles of the invention in the continuous welding of pipe 80 which is being advanced continuously in the direction of the arrow 81. The metal sheet from which the pipe 80 is made is formed in advance of the weld point W as shown in FIG. 32, the side faces 82 and 83 gradually approaching each other in advance of the weld point W and being pressed together or squeezed, as indicated by the arrows 84 and 85, such as by means of squeeze rollers 14 and 15 shown and described in U.S. Pat. No. 2,818,489.

Currents are induced in the pipe 80 by a coil 3h connected to a high frequency source and mainly follow the path indicated by the dotted line 86 indicated in FIG. 33. Thus, where it is possible to do so the principal current path underlies the coil 3h and then flows along the side faces 82 and 83 as indicated by the arrows 87 and 88.

It will be observed that portions of the coil 3h extend substantially parallel to the edge faces 82 and 83 and lie in a plane substantially perpendicular to the median plane of the edge faces 82 and 83.

In the embodiment shown in FIG. 32, the downstream portion of the coil 3h is downstream of the weld point W. Heating of the pipe 80 downstream of the weld point W is not required for welding purposes, although it may be useful in some cases in slowing the cooling of the weld metal 91, and therefore in accordance with the principles described in connection with FIG. 10, the portion 90 has a width greater than the remainder of the coil 3h to reduce heating of the pipe 8 downstream of the weld point W.

As described in connection with FIGS. 5 and 6, the spacing between the portions of the side faces 82 and 83 in which the currents flow is less than five times the radial dimension of the faces 82 and 83, and the spacing of each of the portions 92, 93 and 94 from the side faces 82 and 83 is between ten and one hundred times the reference depth of the currents in the metal of the pipe 80.

One of the advantages of the embodiment shown in FIG. 32 is that the coil 3h does not encircle the pipe 80, and therefore a relatively small coil of low impedance may be used for the welding of pipes of relatively large diameter. If the pipe 80 is of relatively small diameter, the impedance of the pipe 80 may be increased around the inside of the back thereof, with an accompanying decrease of the waste currents around the back of the pipe 80, by inserting a rod 89 of high frequency, magnetic material within the pipe 80 as shown in FIG. 32. Coupling between the coil 3h and the pipe 80 may be increased by similar magnetic material within the coil 3h or at the sides of the coil 3h facing other than toward the pipe 80.

Another advantage of the embodiment shown in FIG. 32 is that there is no contact between the stationary coil 3h and the moving pipe 80. Also, as compared to welding systems requiring electrical contact with the metal of the pipe 80, the embodiment shown in FIG. 32 has the advantage that welding can be performed even if the pipe 80 has a protective coating which may be an electrical insulator.

If desired, the coil for inducing the currents in the pipe 80 may have the shape of the coil 3i shown in FIG. 34, the coil portions 92 and 94 being connected by portions 92a and 94a which extend in the downstream direction and adjacent the edge faces 82 and 83. With the coil 3c shaped as shown in FIG. 34, the main current path follows the portions 92a, and the currents are not concentrated at the faces 82 and 83 until they pass beyond the downstream end of the portions 92a and 94a. However, in the manufacture of pipe, it is often desirable that any upset of metal which may occur as the faces 82 and 83 are pushed together be disposed outwardly, rather than inwardly of the pipe 80.

With the coil 3c shown in FIG. 34, the exterior of the pipe 80 adjacent the faces 82 and 83 receives greater heating, particularly at the upper or more exterior portions or corners of the faces 82 and 83, by reason of the portions 92a and 92b. Thus, when the faces 82 and 83 are pushed together the metal will extrude outwardly more than inwardly due to the higher temperature of the outer portions of the faces 82 and 83.

Also, if desired, the coil for inducing the currents in the pipe 8 may be positioned entirely upstream of the weld point W. FIG. 35 showing a coil 3k so positioned. With this arrangement the currents in the metal downstream of the weld point W may be reduced depending on the position of the coil 3k with respect to the weld point W. Thus, with the portion 95 of the coil 3k directly above the weld point W., little current will flow in the metal downstream of the weld point W. If the portion 95 is moved upstream with respect to the weld point W, only an insignificant amount of current will flow downstream of the weld point W. However, care must be taken not to position the portion 95 too far upstream of the weld point W because the side faces 82 and 83 will commence to cool in their movement from the portion 95 to the weld point, and depending on the metals, the speed of advance of the pipe 80, the temperature to which the side faces are heated while within the coil 3k, etc., the side faces 82 and 83 may cool below the desired welding temperature prior to reaching the weld point W.

When the currents flow at the weld point, the metal at the weld point may "blow out" or be expelled by the magnetic fields of the currents if the metal is molten and is a metal such as aluminum, copper, brass, etc. While explusion may, in some cases, be desirable with some metals, such as copper, brass and aluminum, it is not desirable with other metals or in other cases. Therefore, it is advantageous, at least for some tubing or pipe to locate the portion 95 no farther downstream than the weld point W and preferably, slightly in advance of the weld point W.

The principles of the invention may be used with the manufacture of tubing by helically winding a metal strip, either flat or corrugated, and welding the leading and trailing sides of the strip together as is described in U.S. Pat. No. 2,873,353, the current being caused to flow at the approaching sides by means of a coil of the type shown in FIG. 32 or FIG. 35 rather than being supplied thereto by contacts as shown and described in said patent. Similarly, the principles may be used to weld together a pair of corrugated metal sheets as described in U.S. Pat. No. 3,420,976, the coil again replacing the contacts for providing current flow at the side faces.

FIGS. 36 and 37 illustrate the use of the invention in the welding of corrugated strip. Thus, the metal parts 101 and 102 may be either a pair of metal sheets or portions of the same metal strip, the part 101, in the latter case, being the strip fed toward the weld point and the part 102 being a portion of the strip already formed into a hollow tube as described in U.S. Pat. No. 2,873,353. Currents are induced in the parts 101 and 102 by a coil 3j connected to a high frequency source, and the side faces 103 and 104 are pressed together at the weld point by a pressure roller 105 made of a material, such as ceramic or silicon nitride, having a low electrical conductivity so as to avoid inducing any significant currents in the roller 105. The parts 101 and 102 may be supported at the weld point by another roller 106 which, if desired, may be made of a metal such as steel.

Figure 38:
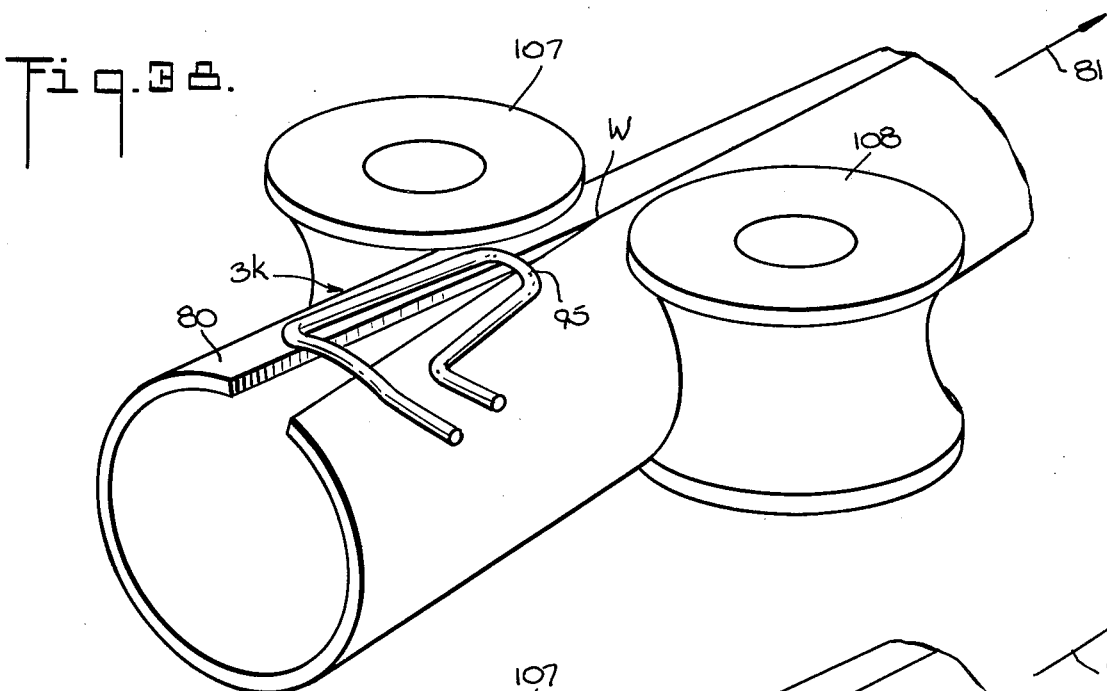
FIG. 38 is a diagrammatic, fragmentary, perspective view illustrating the continuous seam welding of a metal tube.
Figure 39:
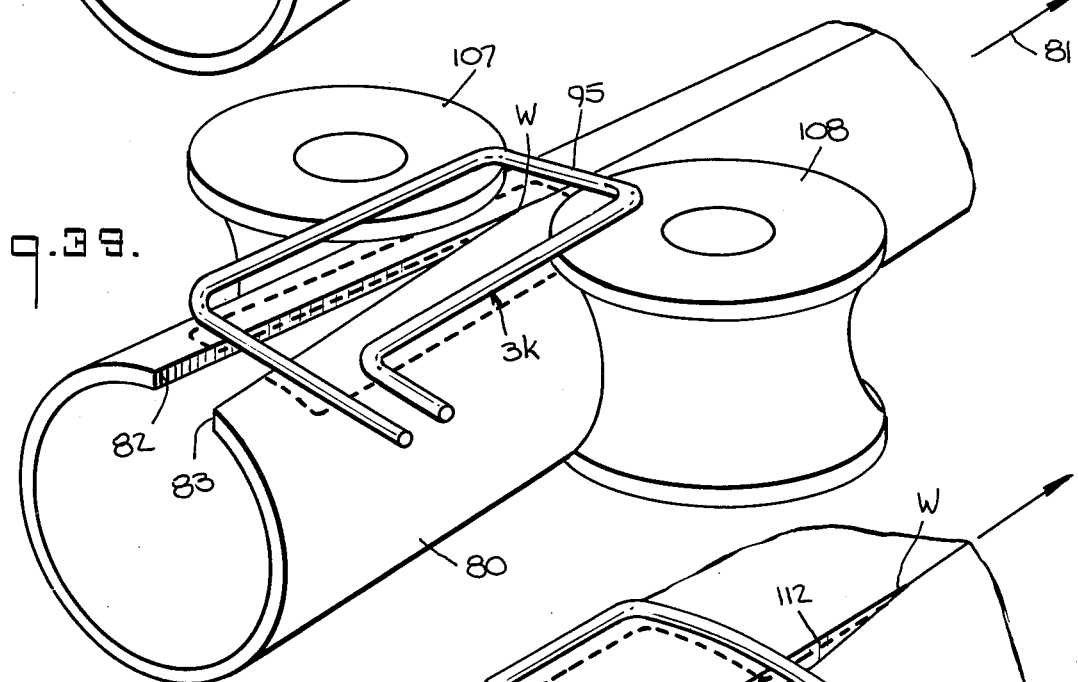
FIG. 39 is a diagrammatic, perspective view similar to FIG. 38 but illustrating a differently placed induction coil.

FIG. 38 is similar to FIG. 35 in that it shows the coil 3k entirely upstream of the weld point W and shows portions of the squeeze rolls 107 and 108 which, in this case may be made of metal because they are outside the coil 3k. FIG. 39 illustrates the coil 3k with the portion 95 thereof downstream of the weld point W, and in this case, the squeeze rollers 107 and 108 should be made of low electrical conductivity material to minimize the currents induced therein.

In the embodiments illustrated in FIGS. 32–38, the temperature reached at the faces to be joined depends not only on the magnitude of the currents but also on the length of time that the currents flow at such faces as they are moved toward the weld point W. Thus, if the length of the faces carrying the currents, i.e., the distance between the upstream end of the current paths and the downstream end of the current paths, is reduced, the currents must be increased in magnitude or the speed of advance of the faces must be reduced if a selected temperature is to be reached during the time that it takes for a portion of the faces to move from underneath the upstream portion of the current inducing coil to the weld point W. If the magnitude of the current is increased, the voltage between the faces also increases increasing the possibility of undesirable arcing or flashover between the faces. Reducing the speed of advance is not desirable because it usually is desirable to accomplish welding at the highest possible speed with equipment of a given capacity.

Mere lengthening of the current inducing coil is not satisfactory because higher voltages are needed to maintain a selected magnitude of current flow at the faces. However, if the lengths of the current paths at the faces can be increased without lengthening the coil, greater heating can be obtained without increasing the voltages or reducing the speed of advance.

Figure 40:
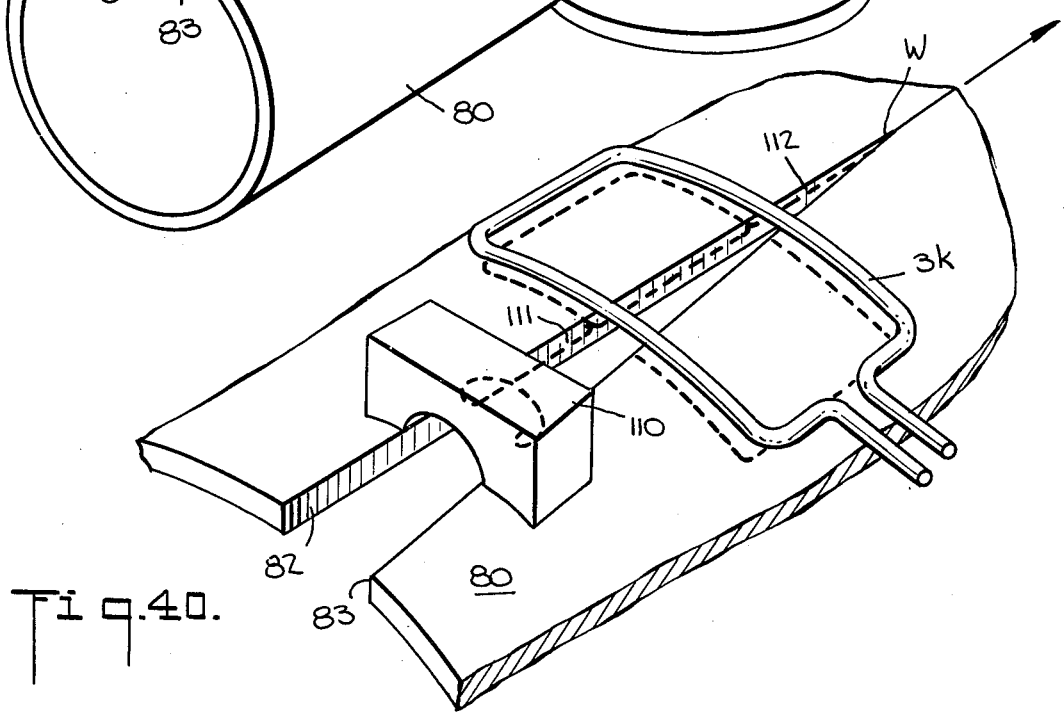
FIG. 40 is a diagrammatic, perspective view illustrating the continuous seam welding of a tube using an induction coil to induce the heating currents in the tube and a bridging contact to lengthen the paths of the current flow.

FIG. 40 illustrates a method for increasing the length of the current paths at the faces to be welded together without increasing the length of the current inducing coil. In the embodiment shown in FIG. 40, the coil 3k induces currents in the pipe or tube 80, and there is a conductive contactor 110 upstream of the upstream end of the coil 3k which bridges the gap between the faces 82 and 83 and contacts the pipe 80. The downstream end of the coil 3k is upstream of the weld point W. With such arrangement, there are not only the currents underlying the coil 3k and flowing on the portions of the faces 82 and 83 between the upstream and downstream ends of the coil 3k but also the currents 111 and 112 outside the ends of the coil 3k. Thus, the current 111 flows on the face 82, across the contactor 110 and on the face 83 upstream of the coil 3k, and the current 112 flows on the face 82 to the weld point W and then on the face 83 downstream of the coil 3k. It will be observed that all the currents on the faces 82 flow oppositely to all the currents on the faces 83.

There are, of course, currents flowing around the back of the pipe 80 which are not useful for welding, and the magnitude thereof depends on the diameter of the pipe 80. The arrangement in FIG. 40 has the further advantage that the voltage between the faces 82 and 83 is reduced because there are multiple current paths on the faces 82 and 83 which, in turn, means that the currents around the back of the pipe 80 will be reduced. Accordingly, the arrangement of FIG. 40 has advantages when the diameter of the pipe 80 is small and may eliminate the need for magnetic material, e.g., an impeder, within the pipe 80.

Figure 41:
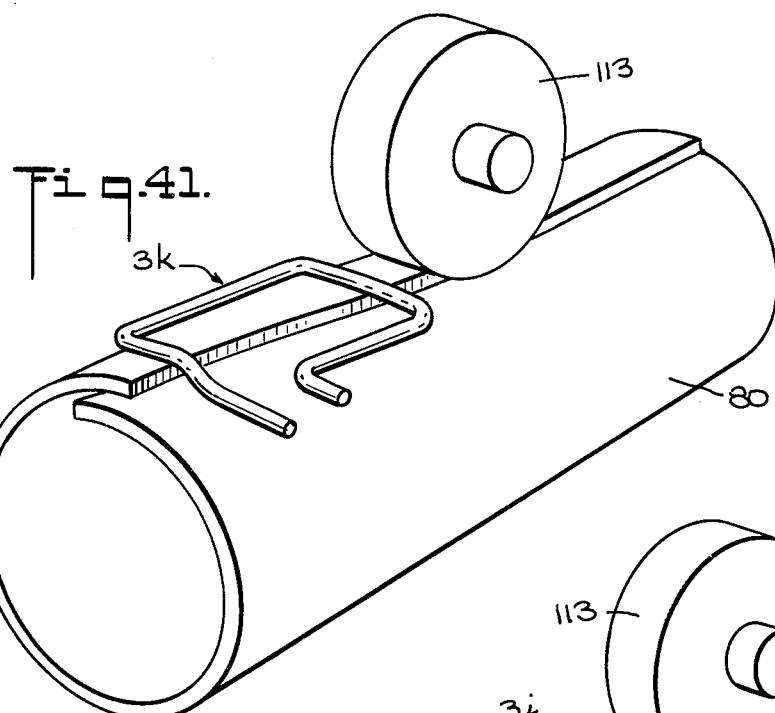
FIG. 41 is a diagrammatic, perspective view illustrating the lap welding together of the overlapping, opposite edge portions of a metal sheet being formed into a tube.
Figure 42:
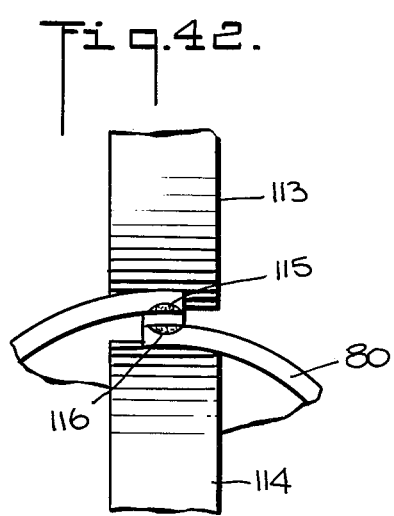
FIG. 42 is a fragmentary, end elevation view of the embodiment shown in FIG. 41 with the induction coil removed for ease of illustration.

FIGS. 41 and 42 illustrate diagrammatically the use of the principles of the invention for lap welding together the edge portions of either a pair of metal parts or of a single sheet being bent to form a pipe 80, the showing of coil 3k being omitted in FIG. 42. In FIG. 41, the coil 3k is upstream of the pressure rollers 113 and 114 used to press the heated portions together and as indicated in FIG. 42 the currents concentrate in the shaded areas 115 and 116 at the facing surfaces to be joined.

Figure 43:
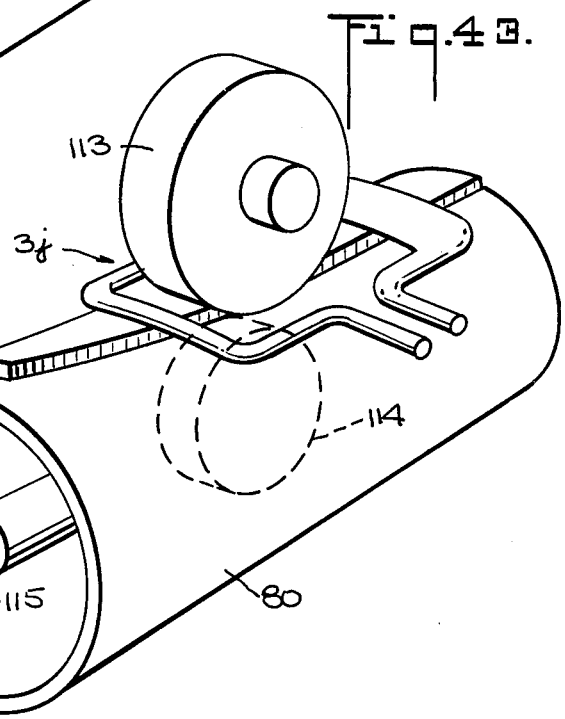
FIG. 43 is a diagrammatic, perspective view similar to FIG. 44 but with the induction coil differently positioned.

FIG. 43 is similar to FIG. 41 except that the coil 3j with a broadened downstream end, is used and the pressure roller 113 is within the coil 3j. The roller 113 should be made of non-conductive material to keep induced currents therein to a minimum. The inner pressure roller 114 may be supported by a mandrel 115 both in FIG. 43 and in the embodiment shown in FIG. 41.

Figure 44:
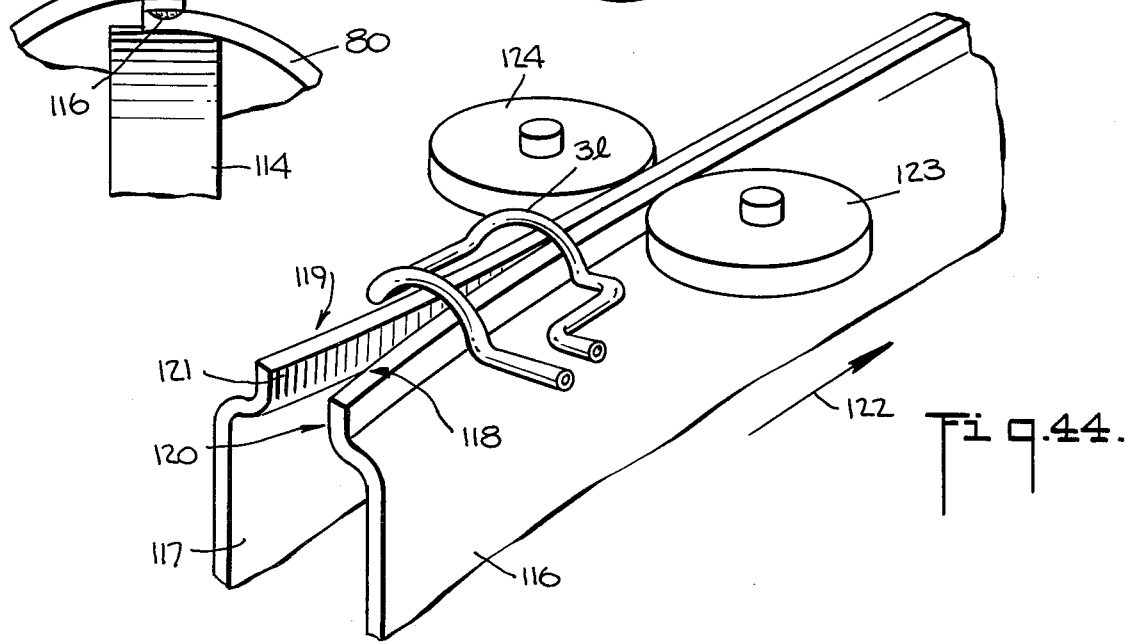

Further applications of the principles of the invention are illustrated in FIGS. 44 and 45. In FIG. 44, a pair of metal parts 116 and 117, which may be separate parts or portions of a single sheet being formed into a tube or pipe, have lips 118 and 119 which are heated on their facing surfaces 120 and 121 by currents induced in the parts by a coil 31 connected to a high frequency source as the parts 116 and 117 are moved in the direction of the arrow 122. The surfaces 120 and 121 are pressed together by a pair of pressure rollers 123 and 124. As with the embodiments in FIGS. 41–43 the return currents are concentrated at the surfaces 120 and 121 and flow in opposite directions.

FIG. 45 illustrates the welding together of a pair of plates 125 and 126 in a manner similar to that described in connection with FIG. 44, the currents being induced by a coil 3m. However, it will be observed that the upper portions of the plates 125 and 126 are nearer to each other than the remainder thereof so that the return currents will be concentrated at the corners 127 and 128. Such relationship between the upper portions of the plates 125 and 126 may be obtained either by tilting the plates 125 and 126 or by curving the upper portions toward each other.

FIG. 46 illustrates the welding of the edge face 129 of a metal plate or web 130 to the side face 131 of a metal strip or flange 132 to form a structural T using the principles of the invention. The currents are induced in the plate 130 and the strip 132 by a coil 3n connected to a high frequency source, and the currents paths underlie the coil 3n where possible. Because of the proximity effect, the return currents, which flow oppositely, flow on the edge face 129 and the portion of the side face 131 immediately adjacent the edge face 129 thereby heating the edge face 129 and such portion of the side face 131 as they are moved toward the weld point W in the direction of the arrow 133. At the weld point W, the heated face 129 and the heated portion of the face 131 are pressed together by means of conventional pressure rollers 134, 135 and 136.

Because the portion of the side face 131 along which current flows is intermediate cooler metal, its temperature will not rise as rapidly as the temperature of the edge face 129 if the currents flowing therein are of the same magnitude and flow therein for equal amounts of time. Therefore, it may be desirable to decrease the current magnitude in the plate 130 by the methods described in connection with FIGS. 9 and 10. For example, by spacing the portions 137, 138 and 139 farther from the plate 130 than the remainder of the coil 3n is from the strip 132, the current at the face 129 will be less than the current at the current carrying portion of the face 131. Also, for example, as described in connection with FIGS. 5 and 6, the loop portion 138 may be nearer the edge face 129 than the loop portion 140 is to the portion of the face 131 to be heated so that the magnitude of the current in the face 129 is less than the magnitude of the current in said portion.

Another way to increase the heating of said portion of the face 131 relative to the edge face 129 is to extend a portion of the induction coil in the upstream direction so that relatively concentrated currents flow in the flange 132 in advance of the point where there is a large proximity effect between the face 131 of the flange 132 and the edge face 129. It will be observed from an examination of FIG. 46 that the flange 132 is curved and gradually approaches the edge face 129 so that, in advance or upstream of the coil 3n, the face 131 is widely spaced from the edge face 129 as compared to the spacing therebetween intermediate the upstream and downstream ends of the coil 3n and consequently, the proximity effect between the currents on the face 131 and the edge face 129 is less upstream of the coil 3n. If the spacing is greater than five times the width of the edge face 129, the proximity effect will be relatively small.

FIG. 47 illustrates one method of decreasing the heating of the edge face 129 relative to the heating of the portion of the face 131 to be joined therewith, and FIGS. 48 and 49 illustrate, in cross section, the major current paths in the flange 132 and the web 130 at different portions thereof.

The coil 3p shown in FIG. 47 has a plurality of portions 141-146 overlying the web 130 and a plurality of portions 147-149 overlying the flange 132, the portions 145-147 and a part of the portion 48 being upstream of the remainder of the coil 3p. As indicated by the shaded areas in FIG. 43, the currents will be concentrated downstream of the portion 144 in paths underlying the coil 3p, at the edge face 129 and at the portion of the face 131 immediately adjacent the edge face 129. However, upstream of the portion 144, the return current distributions on said face 131 and on the faces of the web 30 are different, as indicated in FIGS. 47 and 49, even though the current distribution under the portions of the coil 3p are essentially as shown in FIG. 48.

Thus, as shown in FIGS. 47 and 49 the return currents on the web 130 which correspond to the currents induced by the portion 145 follow not only the edge face 129 but also the paths 150 and 151 on the surface of the web 130 due to the small proximity effect between the edge face 129 and the adjacent portion of the flange face 131. This means that the current and the heating at the edge face 129 from the coil portion 146 to the coil portion 144 is less than the current and the heating at the edge face 129 from the coil portion 147 to the coil portion 141.

However, even though the current in the portion of the flange adjacent to the edge face 129, in advance of the coil portion 144 is more widely distributed because of the small amount of proximity effect, nevertheless, it is at least about the small magnitude as the current in the remainder of such portion of the flange 132 and closely follows the area on the flange 132 where heating is desired. Thus, in contrast to the effects on the edge face 129 of the web 130, said portion of the flange 132 in advance of the coil portion 144 is heated by substantially all the return currents corresponding to the currents induced in the flange 132 by the coil portions 147-149.

A modified form of the coil 3p is designated as 3q in FIGS. 50 and 51. The portions 141-149 are made relatively wide, in accordance with the principles described in connection with FIG. 10, to reduce the current concentration and heating in the portions of the web 130 and the flange 132 where heating for welding purposes is not required. As with coil 3p, the coil 3q has portions 145a and 147 and part of the portion 148 upstream of the portion 144. The portion 145a carries out the functions of the two portions 145 and 146 of the coil 3p and is L-shaped in cross section with one leg 152 overlying the web 130 and the other leg 153 adjacent the portion of the flange 132 to be heated. The leg 153 is near enough to the face 131 to provide significant proximity effect and is spaced from the edge face 129 by a distance greater than the spacing between the leg 152 and the upper surface of the web 130.

With the arrangement shown in FIGS. 50 and 51, the current paths and concentrations are similar for those with the coil 3p (FIGS. 47-49) except that little current flows on the edge face 129 in advance of the coil portion 144 and due to the proximity effect, the current on portion of the face 131 adjacent the coil portion 145 is more concentrated at such portion of the face 131 than it is with the coil 3p. Accordingly, there is relatively little heating of the edge face 129 upstream of the coil portion 144 whereas there is substantial heating of the flange face 131 upstream of the coil portion 144.

Another modified form of the coil 3p is designated as 3r in FIGS. 52 and 53, and the coil 3r provides greater heating of the flange face 131 than at the edge face 129 upstream of the coil portion 146. The coil 3r differs from the coil 3p in that the portions 146 and 147 are interconnected by a loop 154 which is closely adjacent the flange face 131 and which extends into the space between the face 131 and the edge face 129. The loop 154 induces currents in the face 131, as indicated by the shaded areas 155 and 156 in FIG. 53, which heat the face 131 in advance of the coil portion 146. Because of its spacing with respect to the edge face 129, relatively little current is induced in the face 129 by the loop 154. Accordingly, the face 131 will receive greater heating than the face 129 during the time they approach the weld point W.

As another example of the use of the principles of the invention, a metal fin may be welded on the peripheral surface of a tube as illustrated in FIGS. 54 and 55. FIGS. 54 and 55 illustrate diagrammatically the welding of a solid fin 157 of metal to the outer surface of a metal tube 158. Although a solid fin 57 is illustrated, the fin 157 may be serrated, e.g. have slots or cuts extending from the outer edge thereof and radially of the tube 158, provided that the depths of the slots or cuts are not so deep as to interfere with the flow of the currents. The fin 157 is pressed against the tube 158 at the weld point W by a roller 159, conventional in the art, and is guided by conventional devices upstream of the weld point.

As the fin 157 and the tube 158 are heated as described hereinafter, the tube 158 is rotated in the direction of the arrow 159 causing the fin 157 to move in the direction of the arrow 160, apparatus for so rotating the tube 158 as the fin 157 is welded thereto being well known in the art.

Currents are induced in the fin 157 and the tube 158 by means of a coil 3s and flow along the paths indicated by the dotted lines 161 and 162. Thus, the principal current paths underlie the coil where possible and elsewhere, follow the paths of lowest impedance. In this case, due to proximity effect, the principal return currents flow on the portion of the edge face 163 which is below the portion 164 of the coil 3s and flow in the portion of the tube 158 immediately below such portion of the edge face 163.

Because of the mass of the tube 158 as compared to the mass of the fin 157 and because of the location of the portion of the tube 158 to be heated to welding temperature, the tube 158 should receive more heating at such portion than the edge face 163 if such portion and said face 163 are to be close to the same temperature at the weld point W. In this respect, the heating requirements are similar to Those described in connection with FIGS. 47-53, and in the preferred form of the coil 3s, latter is shaped to provide heating of the tube 158 greater than the heating of the face 163. Thus, the coil 3s has a portion 165 which extends into the space between the edge face 163 and close to the surface of the tube 158 so as to cause current to flow in the portion of the tube 158 underlying the edge face 163 in advance of the point where significant currents flow at the edge face 163.

It will be observed that when the fin 157 is applied to the tube 158, the outer portion of the fin 157 must stretch with respect to the inner portion thereof. The heating of the fin 157 by reason of the current underlying the coil portion 164 will aid in such stretching for the reasons described in U.S. Pat. No. 3,047,712.

As mentioned hereinbefore, it may be advantageous with continuous welding, particularly when welding non-ferrous parts together, to make certain that the current inducing coil does not extend downstream of the weld point, e.g. terminates at or before the weld point to prevent magnetic "blow out" of molten metal at the weld point.

Although single turn inducing coils have been shown in the various figures of the drawings, it will be apparent to those skilled in the art that, space permitting, multiple turn coils may be used in place of single turn coils. Also, expedients used by those skilled in the art, to increase the coupling between the coil and the parts to be heated, such as devices of magnetic material, suitable for use at high frequency, may also be used with the embodiments of the invention.

In the continuous welding embodiments of the invention, particularly those shown in FIGS. 32-55, in which the faces or portions to be heated and welded together are brought together along curved paths, the angle between the faces on which the proximity affected currents flow is relatively small so that such faces may be considered generally parallel, and the dimension of such faces in the direction of movement may be considered the width dimension of such faces. Also, it will be observed that in some of the embodiments of the invention the portions of the coil which are to be spaced at least 10 times the reference depth from the faces or portions to be heated and welded together are not exactly parallel to such faces, but they may be considered generally parallel to such faces. As used herein, the expression "generally parallel" is intended to include both parallel and embodiments in which the surfaces or planes extend at small angles, e.g. up to about 20°, with respect to each other.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A method of welding together portions of a metal part or parts, said portions having a width dimension and a thickness dimension, said method comprising:

positioning said portions in adjacent, spaced relation with the width and thickness dimensions generally parallel to each other and with the spacing therebetween not greater than five times the thickness dimension of one of said portions;

causing electrical currents having a frequency of at least 50 Kilohertz to flow in both said portions by means of an induction coil connected to a source of said currents and positioned with respect to said portions so that two oppositely flowing, circulating currents, which follow two closed paths, are produced in said part or parts, said coil having a pair of spaced portions extending generally in the same direction and lying substantially in a plane and said coil being disposed with said plane generally parallel to said width dimension and with said spaced portions of said coil closely adjacent, but spaced from, said part or parts, said coil also being disposed with one of said portions thereof at one side of said portions of said metal and extending generally parallel to one of said portions of said metal part or parts and with the other of said portions of said coil at the other side of said portions of said metal and extending generally parallel to the other of said portions of said metal part or parts, said one portion of said coil being spaced from said one portion of said metal part or parts by a distance at least equal to ten times the reference depth of said currents in the metal of said one portion of said metal and said other portion of said coil being spaced from said other portion of said metal part or parts by a distance at least equal to ten times the reference depth of said currents in the metal of said other portion so that part of one of said closed paths follows the surface of one of said portions which is nearest the surface of the other of said portions and part of the other of said paths follows said last-mentioned surface by reason of the proximity effect between the oppositely flowing currents in said part of one path and in said part of said other path and so that other parts of said paths follow surfaces of said metal part or parts adjacent to said portions of said coil;

maintaining the flow of said circulating currents until said portions of said metal part or parts reach welding temperature at the adjacent surfaces thereof; and pressing said portions together to form a weld therebetween formed by metal of said part or parts.

2. A method as set forth in claim 1 wherein the spacing between said portions to be welded together is less than three times the thickness dimension of one of said last-mentioned portions and the spacing between said portions of said coil and said portions to be welded together is between ten and one hundred times said reference depth.

3. A method as set forth in claims 1 or 2 wherein said one portion of said coil is spaced from said one portion of said metal part or parts by a distance greater than the spacing of said other portion of said coil from said other portion of said metal part or parts.

4. A method as set forth in claim 1 wherein at least a portion of said coil has a cross-sectional shape different from the cross-sectional shape of another portion of said coil.

5. A method as set forth in claim 1 wherein said portions of said metal part or parts are the end faces of a pair of metal part or parts, each end face terminating in the direction of its thickness dimension at first and second surfaces extending at an angle to the end face and wherein:
   said metal part or parts are positioned with said end faces in spaced, facing and generally parallel relation with the spacing therebetween not greater than five times the thickness of said faces; and
   said portions of said coil are side portions of a loop and said loop is disposed with one of said side portions spaced from but closely adjacent to one of said first surfaces, spaced from the end face terminating at said last-mentioned first surface by a distance at least ten times the reference depth of said currents in said last-mentioned end face and substantially parallel to said last-mentioned end face, said one side portion having a length at least equal to the width dimension of said last-mentioned end face, and with the other of said side portions spaced from but closely adjacent to the other of said first surfaces, spaced from the end face terminating at said last-mentioned first surface by a distance at least ten times the reference depth of said currents in said last-mentioned end face and disposed substantially parallel to said last-mentioned end face, said other side portion having a length dimension at least equal to the width dimension of said last-mentioned end face.

6. A method as set forth in claim 5 further comprising inserting a metal member intermediate at least one of said side portions and the adjacent surface and in contact with the latter said metal member being made of a metal having an electrical conductivity higher than the electrical conductivity of said last-mentioned surface and being spaced from said last-mentioned one of said side portions.

7. A method as set forth in claim 5 further comprising placing a metal member in contact with at least one side of the metal part or parts adjacent an end of the end face thereof and selecting the length of and the positioning the side portion of the loop adjacent said last-mentioned metal part or parts so that said last-mentioned side portion extends over and is spaced from said metal member.

8. A method as set forth in claim 7 wherein said metal member is made of a metal having an electrical conductivity higher than the electrical conductivity of the metal part with which it is in contact.

9. A method as set forth in claim 5 wherein said end faces are continuously advanced in the direction of their widths as the currents flow therein and are pressed together at a downstream weld point as they reach welding temperature, said end faces being maintained in spaced relation prior to reaching said weld point.

10. A method as set forth in claim 1 wherein said portions of said metal part or parts are portions thereof adjacent their end faces each end face terminating in the direction of its thickness dimension at first and second surfaces extending at an angle to the end face and wherein:
   said metal parts are positioned with one of said portions at the first surface in overlapping spaced, facing and generally parallel relation with the other of said portions at the second surface and with the spacing therebetween not greater than five times the dimension of one of said portions in a direction perpendicular to the adjacent end face; and
   said portions of said coil are side portions of a loop and said loop is disposed with one of said side portions spaced from but closely adjacent to said first surface, spaced from said one portion by a distance at least ten times the reference depth of said currents in said first surface and disposed generally parallel to said first surface, and with the other of said side portions spaced from but closely adjacent to said second surface, spaced from said other of said portions by a distance at least ten times the reference depth of said currents in said second surface and disposed generally parallel to said second surface dimension of said second surface.

11. A method as set forth in claim 10 further comprising inserting a metal member intermediate at least one of said side portions and the adjacent surface, said metal member being made of a metal having an electrical conductivity higher than the electrical conductivity of said last-mentioned surface and being in contact with said last-mentioned surface but being spaced from said last-mentioned said side portions.

12. A method as set forth in claim 10 wherein said portions of said metal part or parts are continuously advanced in the direction of their widths as the currents flow therein and are pressed together at a downstream weld point as they reach welding temperature, said last-mentioned portions being maintained in spaced relation prior to reaching said weld point.

13. A method as set forth in claim 1 wherein said portions of said metal part or parts are respectively the end face of a first metal part terminating in the direction of its thickness dimension at first and second surfaces extending at an angle to said end face and an intermediate portion of the surface of a second metal part and wherein:
   said first metal part is positioned with its end face in spaced, facing and generally parallel relation to said intermediate portion of said second metal part and with the spacing therebetween not greater than five times the thickness dimension of said end face; and
   said portions of said coil are side portions of a loop and said loop is disposed with one of said side portions spaced from but closely adjacent to said surface of said second metal part, spaced from said portion of said last-mentioned surface by a distance at least ten times the reference depth of said currents in said end face and disposed substantially parallel to said portion of said last-mentioned surface, and with the other of said side portions spaced from but closely adjacent to said first surface, spaced from said end face by a distance at least ten times the reference depth of the currents in said end face and disposed substantially parallel to said end face.

14. A method as set forth in claim 13 wherein said end face and said intermediate portion of said surface of said second metal part are continuously advanced in the direction of their widths as the currents flow therein and are pressed together at a downstream weld point as they reach welding temperature, said last-mentioned end face and said last-mentioned portion being maintained in spaced relation prior to reaching said weld point.

15. A method as set forth in claims 13 or 14 wherein said one of said side portions of said loop is spaced from said portion of said surface of said second metal part by a distance greater than the spacing between said other side portion of said loop and said end face.

16. A method as set forth in claim 14 further comprising pre-heating said intermediate portion of said surface of said second metal part by providing said loop with an extension which is positioned upstream of said other side portion of said loop and which is electrically in series with said side portions of said loop, said extension being positioned closer to said intermediate portion of said surface of said second metal part than said other side portion of said loop.

17. A method as set forth in claim 16 wherein said end face and said intermediate portion of said surface of said second metal part are spaced from each other by a distance greater than five times said reference depth upstream of said other side portion and a portion of said extension is disposed intermediate said end face and said intermediate portion upstream of said other side portion.

18. A method as set forth in claim 17 wherein said portion of said extension is L-shaped in cross-section and wherein said last mentioned portion is positioned with one leg of the L adjacent but spaced from said first surface and with the other leg of the L intermediate said end face and said intermediate portion of said surface of said second metal part, the spacing between said other leg and said end face being greater than the spacing between said one leg and said first surface.

19. A method as set forth in claims 14, 16 or 17 wherein said first metal part is a metal fin and said second metal part is a tube to which said fin is to be welded, wherein said intermediate portion of the surface of a second metal part is the peripheral surface of said tube.

20. A method as set forth in claim 19 wherein said fin in wrapped helically around said tube and said tube is rotated around its axis as the end face of said fin and said intermediate portion of said surface are advanced.

21. A method as set forth in claim 1 wherein said portions of said metal part or parts are lip portions thereof each having an end face, first and second side faces and first and second surfaces spaced from said end faces and forming extensions of said side faces extending at an angle thereto and wherein:
a first side face of one of said lip portions is positioned in spaced, facing and generally parallel relation with a second side face of the other of said lip portions and with the spacing therebetween not greater than five times the dimension of a side face in a direction perpendicular to the adjacent end face; and
said portions of said coil are side portions of a loop and said loop is disposed with one of said side portions spaced from but closely adjacent the surface forming an extension of the second side face of said one lip portion, spaced from said first side face by a distance at least equal to ten times the reference depth of said currents in said first side face and disposed generally parallel to said first side face, and with the other of said side portions spaced from but closely adjacent the surface forming an extension of the first side surface of said other lip portion, spaced from said second side face by a distance at least ten times the reference depth of said currents in said second side face and disposed generally parallel to said second side face.

22. A method as set forth in claim 21 further comprising inserting a metal member intermediate at least one of said side portions and the adjacent surface and in contact with the latter, said metal member being spaced from said last-mentioned one of said side portions and being made of a metal having an electrical conductivity higher than the electrical conductivity of said last-mentioned surface.

23. A method as set forth in claim 21 wherein said first face and said second side face are continuously advanced in the direction of their widths as the currents flow therein and are pressed together at a downstream weld point as they reach welding temperature, said first side face and said second side face being maintained in spaced relation prior to reaching said weld point.

24. A method as set forth in claim 1 wherein said portions of said metal part or parts are respectively on the end face of a first cylindrical metal part and on the end face of a second cylindrical metal part and wherein:
said first part is positioned co-axially with said second part with the end face of said first part in spaced, facing and substantially parallel relation to the end face of said second part and with the spacing therebetween not greater than five times the thickness dimension of the portion on one said end face at which said currents flow;
said portions of said coil are side portions of a loop and said loop is disposed with one of said side portions spaced from but closely adjacent the peripheral surface of said first part, spaced from said end face of said first part in the axial direction of said first part by a distance at least ten times the reference depth of said currents in said last-mentioned face and disposed substantially parallel to said last-mentioned end face, and with the other of said side portions spaced from but closely adjacent the peripheral surface of said second part, spaced from said end surface of said second part a distance at least ten times the reference depth of said currents in said last-mentioned end face and disposed substantially parallel to said last-mentioned end face, each of said side portions being connected at its respective ends to axially extending portions which extend over the peripheral edges of said end face of said first part and said end face of said second part, and said axially extending portions being spaced apart less than 180° at least where they overlie said edges of the end faces; and
rotating said first and said second parts around their axes as said currents are induced therein.

25. A method as set forth in claim 24 wherein said first part and said second part are hollow, cylindrical tubes or pipes.

26. A method as set forth in claim 1 wherein said portions of said metal part or parts are the side faces of a plurality of metal parts, each part having said side faces intersecting at an angle at one end thereof and being interconnected at their opposite ends by at least one further face and wherein:

said parts are positioned with its side faces in spaced, facing and substantially parallel relation respectively to the side faces of a pair of other metal parts and with the spacing between the side faces not greater than five time the thickness dimension of adjacent faces; and said coil is disposed adjacent the further faces of said parts.

27. A method as set forth in claim 1 wherein said portions of a metal part or parts are the opposite and adjacent end faces of a metal part bent substantially into a tube and wherein:

said end faces are continuously advanced in the direction of the axis of said tube and are pressed together at a weld point in the downstream direction of advance, said end faces having a V-shaped gap therebetween in advance of said weld point, said end faces being generally parallel to and facing each other in advance of the weld point and the spacing of said end faces being not greater than five times the thickness of the end faces from a point upstream of the weld point to the weld point; and said portions of said coil are side portions of a loop having a first further portion interconnecting one end of one of said side portions to one end of the other of said side portions and a second further portion connected to at least the opposite end of at least one of said side portions and said loop is disposed with said first further portion adjacent said weld point and in spaced but closely adjacent relation to said tube, with said second further portion upstream of said weld point and spaced from said tube with one of said side portions spaced from but closely adjacent to said tube at one side of said gap, generally parallel to the end face at said one side of said gap and spaced from said last-mentioned end face, at least in advance of said weld point, by a distance at least ten times the reference depth of said currents in said last-mentioned end face and with the other of said side portions spaced from but closely adjacent to said tube at the other side of said gap, generally parallel to the end face at said other side of said gap and spaced from said last-mentioned end face, at least in advance of said weld point, by a distance at least ten times the reference depth of said currents in said last-mentioned end face.

28. A method as set forth in claim 27 wherein said first further portion of said loop is disposed downstream of said weld point.

29. A method as set forth in claim 28 wherein the cross-sectional dimension of said first further portion in the direction of advance of said end faces is greater than the cross-sectional dimension of other portions of said loop.

30. A method as set forth in claim 27 or 29 wherein said second further portion of said loop interconnects the opposite ends of said side portions of said loop.

31. A method as set forth in claim 30 wherein said second further portion also has portions which extend downstream from said opposite ends of said side portions and said loop is positioned so that said portions of said second further portion are closely adjacent and substantially parallel to end faces.

32. A method as set forth in claim 27 wherein said first further portion is disposed upstream of said weld point.

33. A method as set forth in claim 27 or 32 further comprising bridging said gap with an electrically conductive member in contact with said tube adjacent said end faces and points thereon spaced from said second further portion in the direction upstream thereof.

34. A method of heating portions of a metal part or parts, said portions having a width dimension and a thickness dimension, said method comprising:

positioning said portions in adjacent, spaced relation with the width and thickness dimensions generally parallel to each other and with the spacing therebetween not greater than five times the thickness dimension of one of said portions;

causing currents having a frequency of at least 50 kilohertz to flow in both said portions by induction coil means connected to a source of said currents and positioned with respect to said portions so that a first circulating current following a closed path is produced in the part of which one of said portions is a portion, at least a portion of said path following the surface of said one of said portions and the remainder of said path following the surface of said last-mentioned part closest to said coil means and so that a second current flows along the surface of the other of said portions in the opposite direction, at any instant with respect to the current flowing in said one portion, said coil means having a portion which is disposed closely adjacent but spaced from said last-mentioned part, which is generally parallel to said one portion and which is spaced from said one portion by a distance at least equal to ten times the reference depth of said currents in said one portion and said coil means having another portion coupled to the part of which said other portion is a portion to cause said second current to flow along the surface of said other portion.

35. A method as set forth in claim 34 wherein said other portion of said coil is a conductor which is disposed closely adjacent but spaced from said part of which said other portion is a portion, which is generally parallel to said other portion and which is spaced from said other portion by a distance at least equal to ten times the reference depth of said currents in said other portion.

36. A method as set forth in claim 34 wherein said other portion of said coil comprises a pair of contacts conductively coupling said first-mentioned portion of said coil to said last-mentioned part, one of said contacts being in contact with said last-mentioned part at one end of said other portion and the other of said contacts being in contact with said last-mentioned part at the other end of said other portion.

37. A method as set forth in claim 35 or 36 further comprising maintaining the flow of said currents and the heating of said portions until the latter reach welding temperature and then, pressing said portions together to form a weld therebetween formed by metal of said part or parts.

38. A method of welding together face portions of a metal part or parts, at least one of said portions being wide relative to its thickness, said method comprising:

positioning said portions in adjacent, spaced relation with the faces thereof generally parallel to each other and with the spacing therebetween not greater than five times said thickness;

placing a pair of contacts in contact with the metal part of which one of said portions is a portion, one contact adjacent one end of said last-mentioned one portion and one contact adjacent the other end of said last-mentioned portion;

supplying electrical currents having a frequency of at least 50 kilohertz to said contacts through a pair of conductors, connected respectively to said contacts and positioning at least one of said conductors so that at least a portion thereof extends substantially parallel to said portions, is spaced from but closely adjacent the metal part of which the other portion facing said last-mentioned one portion is a portion and is spaced from said other portion by a distance at least equal to ten times the reference depth of the currents in said other portion, whereby, at any instant, the current flowing in said last-mentioned one portion flows oppositely to the current flowing in said other portion;

continuing to supply said currents to said contacts until said portions of said metal part or parts reach welding temperature at the adjacent faces thereof; and pressing said portions together to form a weld therebetween formed by metal of said part or parts.

39. A method as set forth in claim 38 wherein said face portions are the end faces of a metal part or parts.

40. A method as set forth in claim 38 wherein said face portions are respectively the end face of a metal part and a side face of said part or a further metal part.

41. A method of welding together the end face of a metal web to an intermediate portion of the surface of a metal flange said end face and said intermediate portion having a width dimension and a thickness dimension, said method comprising:

positioning said web with its end face in spaced, facing and generally parallel relation to said intermediate portion of said flange and with the spacing therebetween not greater than five times the thickness dimension of said end face;

continuously advancing said web and said flange in the direction of the widths of said end face and said portion and bringing said end face and said portion together at a downstream weld point while maintaining them in spaced relation prior to reaching the weld point;

causing electrical currents having a frequency of at least 50 kilohertz to flow in said end face and said portion as they are advanced by means of an induction coil connected to a source of said currents and positioned with respect to said end face and said portion so that two oppositely flowing, circulating currents, which follow two closed paths, are produced in said web and said flange, said coil having a pair of spaced portions extending generally in the same direction and lying substantially in a plane and said coil being disposed with said plane generally parallel to said width dimension and with one of said spaced portions of said coil closely adjacent, but spaced from, said web and extending generally parallel to said end face and with the other of said portions of said coil closely adjacent, but spaced from, said flange and extending generally parallel to said portion of said flange, said one portion of said coil being spaced from said end face by a distance at least equal to ten times the reference depth of said currents in the metal of said web and said other portion of said coil being spaced from said portion of said flange by a distance at least equal to ten times the reference depth of said currents in the metal of said flange so that part of one of said closed paths follows the surface of said end face and part of the other of said paths follows said portion of said flange by reason of the proximity effect between the oppositely flowing currents in said part of one path and in said part of said other path and so that other parts of said paths follow surfaces of said web and said flange adjacent to said portions of said coil;

maintaining the flow of said circulating currents in said end face and said portion of said flange in a magnitude sufficient to cause them to reach welding temperature at the adjacent surfaces thereof when they reach the weld point;

pressing said end face and said portion together at the weld point to form a weld therebetween formed by metal of said web and said flange.

42. A method as set forth in claim 41 wherein the spacing between said end face and said portion of said flange is not greater than two times the thickness dimension of said end face and the spacing between said portions of said coil and said portions to be welded together is between ten and one hundred times said reference depth.

43. A method as set forth in claim 41 or 42 wherein said one of said portions of said coil is spaced from said web by a distance different from the spacing between said other portion of said coil and said flange to cause heating of said end face which is different from the heating of said portion of said flange.

44. A method as set forth in claim 41 or 42 wherein said one of said portions of said coil is spaced from said end face by a distance which is different from the spacing between said other portion of said coil and said portion of said flange to cause heating of said end face which is different from the heating of said portion of said flange.

* * * * *